(12) United States Patent  (10) Patent No.: US 9,577,551 B2
Aiura  (45) Date of Patent: Feb. 21, 2017

(54) MOTOR DRIVE APPARATUS

(71) Applicant: Asahi Kasei Microdevices Corporation, Tokyo (JP)

(72) Inventor: Masami Aiura, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days.

(21) Appl. No.: 14/919,952

(22) Filed: Oct. 22, 2015

(65) Prior Publication Data

US 2016/0043667 A1  Feb. 11, 2016

Related U.S. Application Data

(63) Continuation of application No. PCT/JP2013/007596, filed on Dec. 25, 2013.

(30) Foreign Application Priority Data

Apr. 26, 2013 (JP) .................. 2013-093799
Jun. 18, 2013 (JP) .................. 2013-127576

(51) Int. Cl.
*H02P 3/14* (2006.01)
*H02P 8/12* (2006.01)
(Continued)

(52) U.S. Cl.
CPC . *H02P 3/14* (2013.01); *H02P 3/08* (2013.01); *H02P 3/12* (2013.01); *H02P 8/12* (2013.01)

(58) Field of Classification Search
CPC ........................................................... H02P 3/14
(Continued)

(56) References Cited

U.S. PATENT DOCUMENTS 6,013,994 A * 1/2000 Endo .................. B62D 5/0463
                                                                318/430
2005/0134211 A1  6/2005 Fukamizu et al.
2008/0315804 A1  12/2008 Nishibe et al.

FOREIGN PATENT DOCUMENTS

EP  899595 A2  3/1999
JP  H11084268 A  3/1999
(Continued)

OTHER PUBLICATIONS

International Search Report dated Mar. 25, 2014, for corresponding International Application No. PCT/JP2013/007596.
(Continued)

*Primary Examiner* — David S Luo
(74) *Attorney, Agent, or Firm* — Morgan, Lewis & Bockius LLP

(57) ABSTRACT

A motor drive apparatus that controls a current flowing through a coil of a motor, including a comparing section that compares the current flowing through the coil to a control current input thereto; an operation selecting section that selects an operational state according to a comparison result of the comparing section; a driving section that receives a designation signal designating a current mode and a stop mode, drives the coil in the operational state selected by the operation selecting section when the designation signal designating the conductive mode is received, and drives the coil in the braking state when the designation signal designating the stop mode is received; and a setting section that controls a start of the designation signal designating the stop mode or a start of a period during which the control current is zero.

22 Claims, 17 Drawing Sheets

(51) Int. Cl.
*H02P 3/08* (2006.01)
*H02P 3/12* (2006.01)

(58) Field of Classification Search
USPC .......................................... 318/376, 375, 362
See application file for complete search history.

(56) References Cited

FOREIGN PATENT DOCUMENTS

| | | | |
|---|---|---|---|
| JP | 2003-230293 | A | 8/2003 |
| JP | 2005-185020 | A | 7/2005 |
| JP | 2008-072876 | A | 3/2008 |
| JP | 2009-005460 | A | 1/2009 |
| JP | 2010-283951 | A | 12/2010 |

OTHER PUBLICATIONS

International Preliminary Report on Patentability dated Nov. 5, 2015, for corresponding International Application No. PCT/JP2013/007596.

* cited by examiner

MOTOR DRIVE APPARATUS

The contents of the following Japanese patent applications are incorporated herein by reference:
 No. JP2013-093799 filed on Apr. 26, 2013, and
 No. JP2013-127576 filed on Jun. 18, 2013.

BACKGROUND

1. Technical Field

The present invention relates to a motor drive apparatus.

2. Related Art

Technology is known by which a motor drive apparatus for controlling the current flowing through a coil, such as a stepping motor, stops the current from flowing through the coil by causing the current to circulate in the coil while switching the flow of the current, as shown in Patent Document 1, for example.

Patent Document 1: Japanese Patent Application Publication No. 2008-72876

However, with the apparatus described above, when the current of the coil is stopped, disconnecting the coil from the power supply such that the current circulates in the coil causes the current flowing in the coil to be attenuated, and therefore there is a problem that a long time is necessary for the current flowing in the coil to reach zero.

SUMMARY

Therefore, it is an object of an aspect of the innovations herein to provide a motor drive apparatus, which is capable of overcoming the above drawbacks accompanying the related art. The above and other objects can be achieved by combinations described in the claims. According to a first aspect of the present invention, provided is a motor drive apparatus that controls a current flowing through a coil of a motor, comprising a comparing section that compares the current flowing through the coil to a control current input thereto; an operation selecting section that selects an operational state from among a drive state, a regenerative state, and a braking state, according to a comparison result of the comparing section; a driving section that receives a designation signal designating a current mode that includes a conductive mode in which the current flows through the coil and a stop mode in which the current flowing through the coil is stopped, drives the coil in the operational state selected by the operation selecting section when the designation signal designating the conductive mode is received, and drives the coil in the braking state when the designation signal designating the stop mode is received; and a setting section that controls a start of the designation signal designating the stop mode or a start of a period during which the control current is zero.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
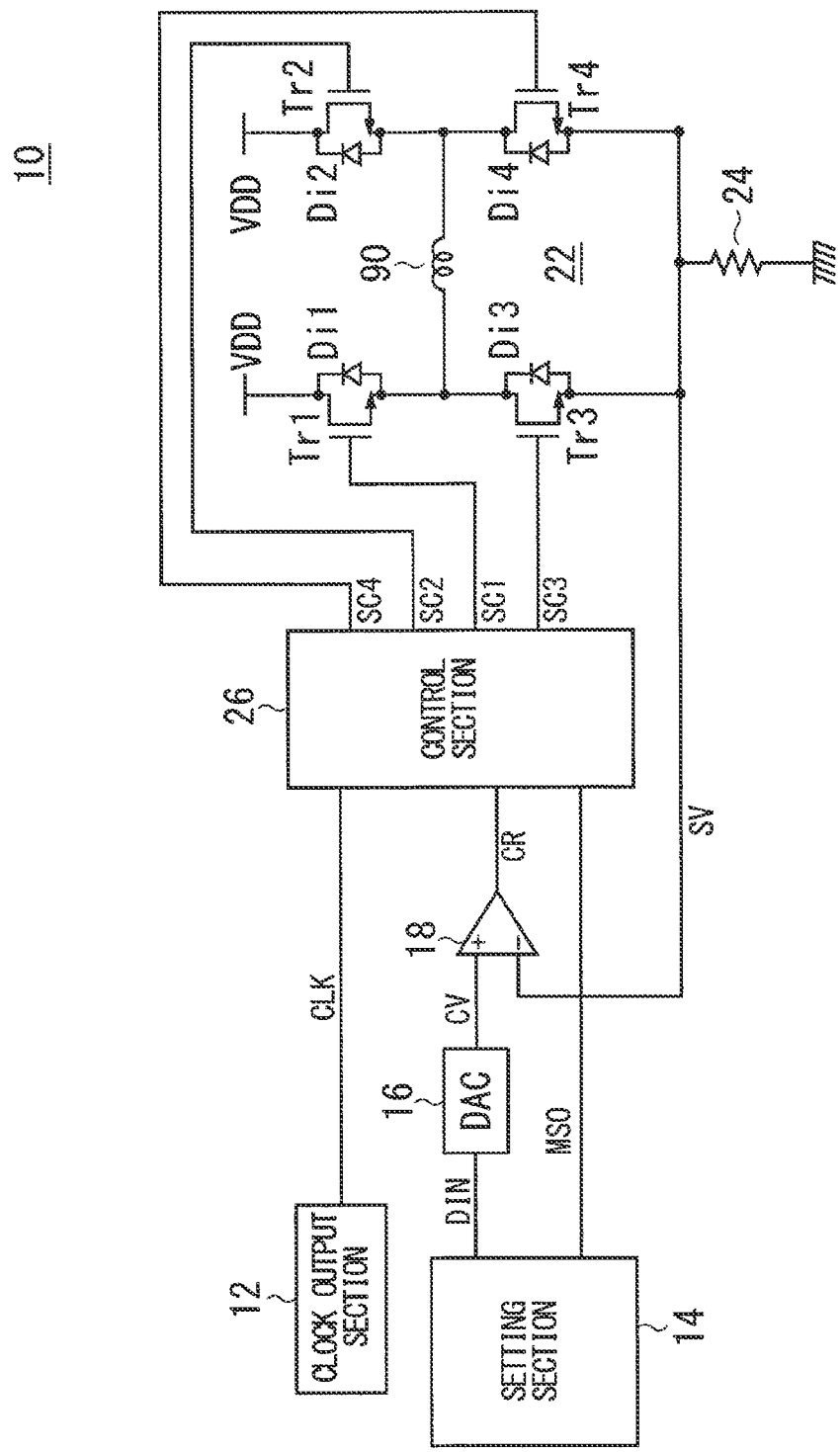
FIG. 1 is a drawing for describing the overall configuration of a motor drive apparatus 10.

FIG. 1 is a drawing for describing the overall configuration of a motor drive apparatus 10. The motor drive apparatus 10 controls the current flowing through a coil 90 for driving, such as a stepping motor. Here, the motor includes a plurality of coils 90, but for ease of explanation, FIG. 1 shows only one representative coil 90. The motor drive apparatus 10 receives a designation signal MSO that designates a current mode including a conductive mode in which current flows through the coil 90 and a stop mode in which the flow of the current through the coil 90 is stopped, thereby controlling the current of the coil 90. The motor drive apparatus 10 delays the designation signal MS that designates the stop mode and, after receiving the stop mode designation, waits for a certain time before continuing with the conductive mode, thereby decreasing the time needed to stop the current after the output of the designation signal MS that designates the stop mode.

The motor drive apparatus 10 includes a clock output section 12, a setting section 14, a D/A converter 16, a comparing section 18, a setting section 14, an H-bridge circuit 22, a sense resistor 24, and a control section 26.

The clock output section 12 is connected to the control section 26. The clock output section 12 outputs a clock CLK for controlling the motor drive apparatus 10 to the control section 26.

The setting section 14 is connected to the D/A converter 16. The setting section 14 outputs a control current value DIN to the D/A converter 16. The control current value DIN is a digital value of the current flowing through the coil 90, and is used to determine which operational state is set.

The D/A converter 16 is connected to the comparing section 18. The D/A converter 16 performs an analog conversion on a control voltage CV corresponding to the control current value DIN output from the setting section 14, and outputs the result to the non-inverted input of the comparing section 18. The control voltage CV corresponding to the control current DIN that has undergone the analog conversion changes over time according to a sine wave or cosine wave when the motor drive apparatus 10 is rotating at a constant speed, for example.

The setting section 14 is connected to the control section 26. The setting section 14 outputs the designation signal MSO that designates the current mode. The current mode includes the conductive mode, which has a forward direction mode and a backward direction mode, and the stop mode. The conductive mode is the mode in which the current flows through the coil 90. The stop mode is the mode in which the current flowing through the coil 90 is stopped.

The inverted input of the comparing section 18 is connected to the sense resistor 24. The comparing section 18 compares the control voltage CV corresponding to the control current value DIN that has undergone the analog conversion by the D/A converter 16 and been input to the non-inverted input to a sense voltage SV corresponding to a sense current flowing through the sense resistor 24. In other words, the comparing section 18 compares the magnitude of the control current to the magnitude of the sense current. The sense current is the same current as the current flowing through the coil 90. The output side of the comparing section 18 is connected to the control section 26. The comparing section 18 outputs the comparison result CR between the control current and the sense current to the control section 26. The comparison result CR is high level when the sense current is greater than the control current, and is low level when the sense current is smaller than the control current.

The H-bridge circuit 22 includes four transistors Tr1, Tr2, Tr3, and Tr4 that function as switches. The ON resistances of the transistors Tr1, Tr2, Tr3, and Tr4 are hundreds of mΩ. On the other hand, the resistance of the coil 90 is from hundreds of mΩ to several Ω. The drain of the transistor Tr1 is connected to the power supply. Accordingly, a power supply voltage VDD is applied to the drain of the transistor Tr1. The source of the transistor Tr1 is connected to one end of the coil 90. The drain of the transistor Tr2 is connected to the power supply. Accordingly, the power supply voltage VDD is applied to the drain of the transistor Tr2. The source of the transistor Tr2 is connected to the other end of the coil 90. The drain of the transistor Tr3 is connected to the one end of the coil 90 and the drain of the transistor Tr1. The source of the transistor Tr3 is connected to one end of the sense resistor 24. The drain of the transistor Tr4 is connected to the other end of the coil 90 and the source of the transistor Tr2. The source of the transistor Tr4 is connected to the one end of the sense resistor 24. Diodes Di1, Di2, Di3, and Di4, which are connected in parallel with the transistors Tr1, Tr2, Tr3, and Tr4, are parasitic diodes formed on the structure.

The other end of the sense resistor 24 is connected to a reference potential. The one end of the sense resistor 24 is connected to the sources of the transistors Tr3 and Tr4 of the H-bridge circuit 22 and to the inverted input of the comparing section 18. Accordingly, the sense voltage SV corresponding to the sense current that is the same as the current flowing through the coil 90 is input to the inverted input of the comparing section 18.

The control section 26 outputs control signals SC1, SC2, SC3, and SC4 for switching the transistors Tr1, Tr2, Tr3, and Tr4 ON and OFF, based on the clock CLK output from the clock output section 12, the comparison result CR output from the comparing section 18, and the designation signal of the current mode. In this way, the control section 26 controls the value and direction of the current flowing through the coil 90.

Figure 2:
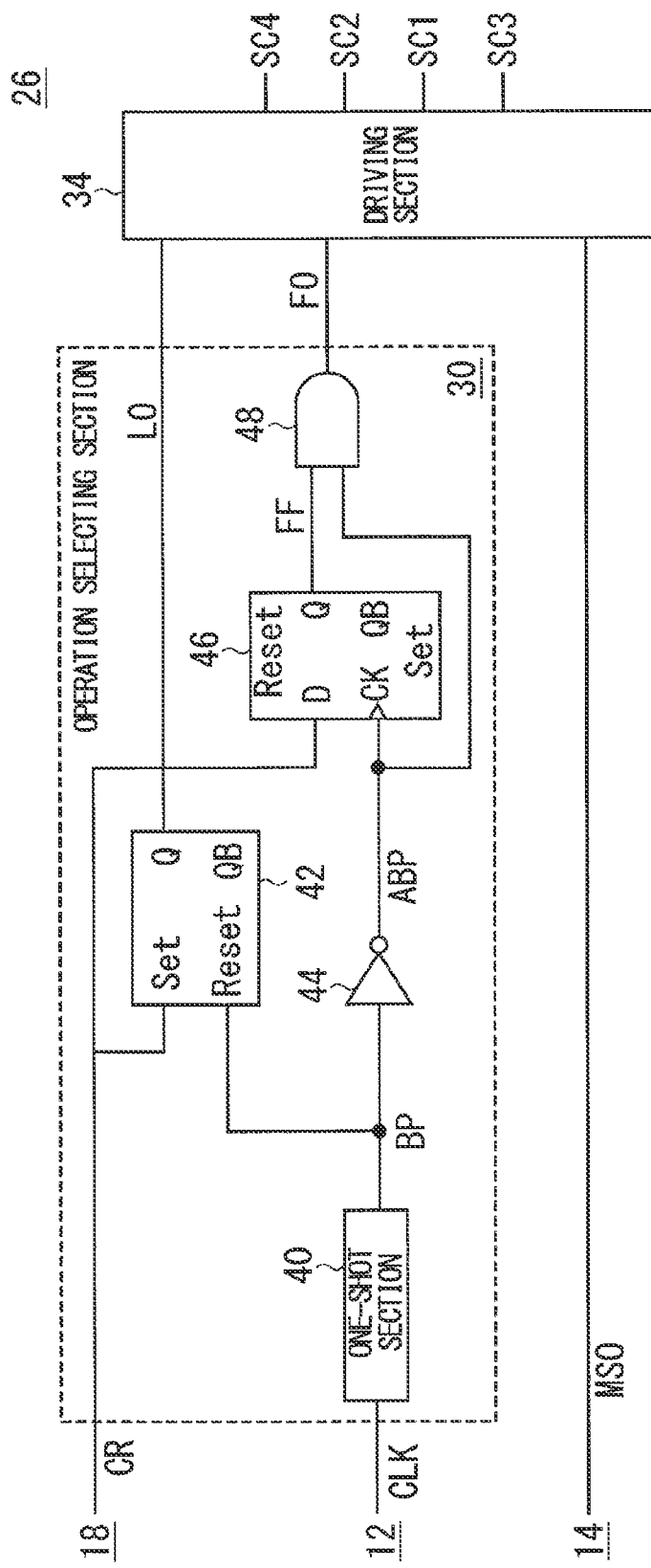
FIG. 2 is a drawing for describing the configuration of the control section 26.

FIG. 2 is a drawing for describing the configuration of the control section 26. As shown in FIG. 2, the control section 26 includes an operation selecting section 30 and a driving section 34.

The input side of the operation selecting section 30 is connected to the output side of the comparing section 18 and the output side of the clock output section 12. The output side of the operation selecting section 30 is connected to the input side of the driving section 34. The operation selecting section 30 selects one operational state from among a drive state (Charge Drive state), a regenerative state (Fast Decay state), and a braking state (Slow Decay state or Brake state), according to the comparison result CR from the comparing section 18, and outputs the selection result to the driving section 34. The drive state includes supplying current from the power supply to the coil 90. The regenerative state includes regenerating the power supply with current from the coil 90, thereby charging the power supply. The regenerative state may include charging a capacitor instead of the power supply. The braking state includes circulating the current in a current path including the coil 90.

The operation selecting section 30 includes a one-shot section 40, an SR latch section 42, a NOT circuit 44, a D-FF section 46, and an AND circuit 48.

The one-shot section 40 acquires the clock CLK. The one-shot section 40 outputs to the SR latch section 42 and the NOT circuit 44 a blanking pulse BP that includes a rising pulse that is shorter than the rising pulse of the acquired clock CLK.

The Set port of the SR latch section 42 is connected to the comparing section 18. The Set port of the SR latch section 42 acquires the comparison result CR from the comparing section 18. The Reset port of the SR latch section 42 is connected to the one-shot section 40. The Reset port of the SR latch section 42 acquires the blanking pulse from the one-shot section 40. The SR latch section 42 has reset priority. Accordingly, when the blanking pulse BP is high level, the SR latch section 42 outputs a latch output LO that is low level. On the other hand, when the comparison result CR is high level and the blanking pulse BP is low level, the SR latch section 42 outputs a latch output LO that is high level. When the comparison result CR and the blanking pulse BP are both low level, the SR latch section 42 maintains the level of the latch output LO being output to the driving section 34.

The NOT circuit 44 is connected to the one-shot section 40. The NOT circuit 44 acquires the blanking pulse BP from the one-shot section 40. The NOT circuit 44 outputs to the D-FF section 46 and the AND circuit 48 an inverted blanking pulse ABP obtained by inverting the acquired blanking pulse BP.

The data port (=D port) of the D-FF section 46 is connected to the comparing section 18. The data port of the D-FF section 46 acquires the comparison result CR from the comparing section 18. The clock port (=CK port) of the D-FF section 46 is connected to the NOT circuit 44. The clock port of the D-FF section 46 acquires the inverted blanking pulse ABP from the NOT circuit 44. The D-FF section 46 outputs, as the FF output FF, the comparison result CR for the falling of the blanking pulse BP, i.e. the rising of the inverted blanking pulse ABP, and maintains this output until the next rising of the inverted blanking pulse ABP.

The AND circuit 48 is connected to the D-FF section 46 and the NOT circuit 44. The AND circuit 48 acquires the FF output FF from the D-FF section 46 and the inverted blanking pulse ABP from the NOT circuit 44, and outputs the AND of the FF output FF and the inverted blanking pulse ABP. In other words, when the FF output FF and the inverted blanking pulse ABP are both high level, the AND circuit 48 outputs the Fast output FO with a high level to the driving section 34. When one of the FF output FF and the inverted blanking pulse ABP is low level, the AND circuit 48 outputs the Fast output FO with a low level to the driving section 34.

The operation selecting section 30 outputs to the driving section 34 four combinations including the latch output LO with a high level and with a low level and the Fast output FO with a high level and with a low level, as the selection result of the operational state. When the latch output LO is low level, the output of the operation selecting section 30 indicates the drive state. When the latch level LO is high level and the Fast output FO is high level, the output of the operation selecting section 30 indicates the regenerative state. When the latch output LO is high level and the Fast output FO is low level, the output of the operation selecting section 30 indicates the braking state.

The driving section 34 receives the designation signal MSO that designates the current mode, which includes the conductive mode in which current flows through the coil 90 and the stop mode in which the flow of current through the coil 90 is stopped. Upon receiving the designation signal MSO designating the conductive mode, the driving section 34 drives the coil 90 in the operational state selected by the operation selecting section 30. Upon receiving the designation signal MSO designating the stop mode, the driving section 34 drives the coil 90 in the braking state.

Figure 3:
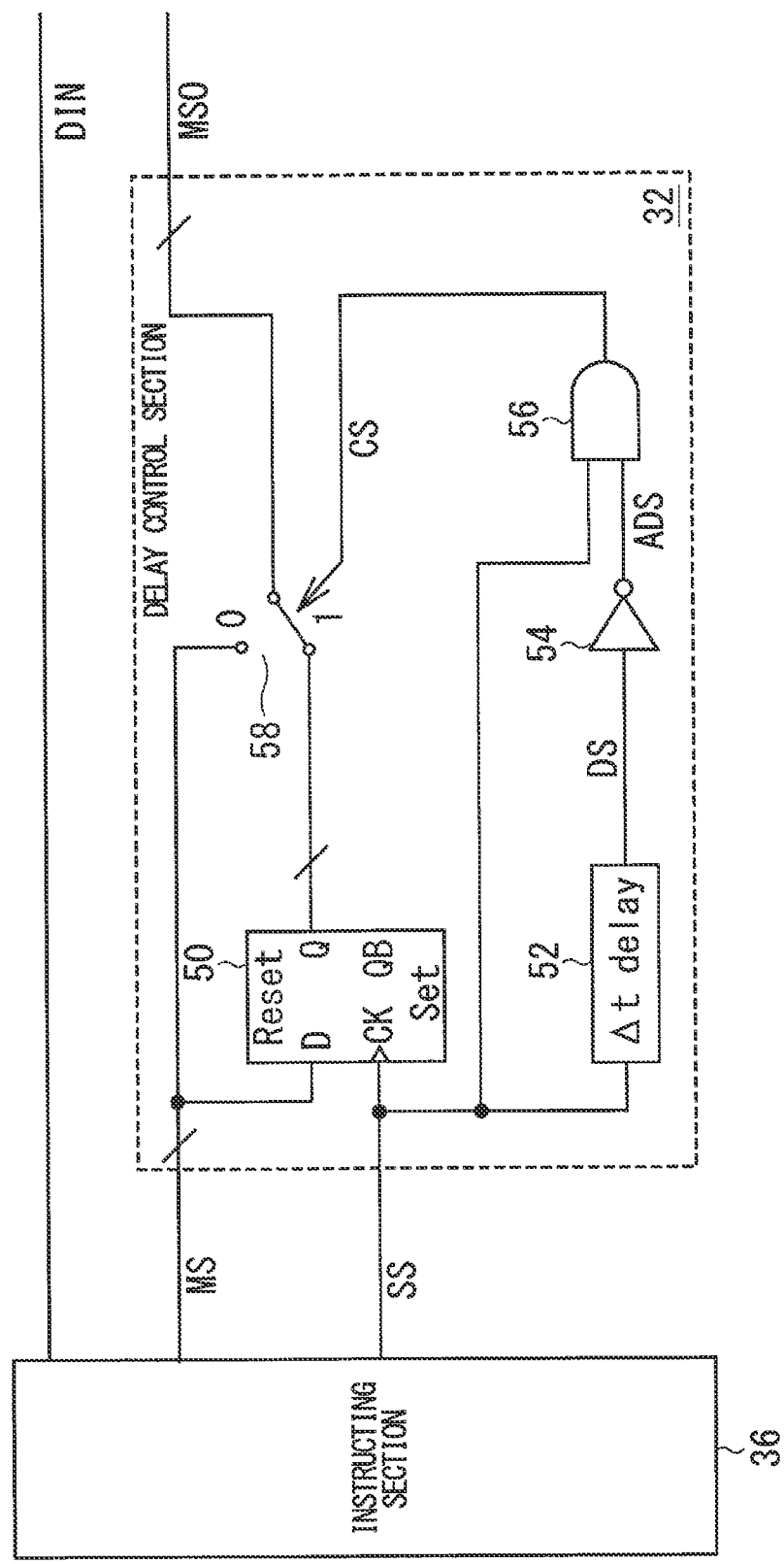
FIG. 3 is a drawing for describing the configuration of the setting section 14.

FIG. 3 is a drawing for describing the configuration of the setting section 14. As shown in FIG. 3, the setting section 14 includes an instructing section 36 and a delay control section 32.

When the control current is zero, the instructing section 36 outputs a stop signal SS that delays the stop mode, in addition to the designation signal MS. When the control current is zero the instructing section 36 outputs the stop signal SS with a high level.

The delay control section 32 is connected to the instructing section 36. While receiving the designation signal MS that designates the conductive mode within the current mode, the delay control section 32 outputs the designation signal MS to the driving section 34 without delaying this signal. When the designation signal MS designating the stop mode within the current mode is received, the delay control section 32 delays the designation signal MS designating the stop mode for the driving section 34.

The delay control section 32 includes a D-FF section 50, a delaying section 52, a NOT circuit 54, an AND circuit 56, and a switch 58.

The data port (=D port) of the D-FF section 50 is connected to the instructing section 36. The data port of the D-FF section 50 acquires the designation signal MS from the instructing section 36. The clock port (=CLK port) of the D-FF section 50 is connected to the instructing section 36. The clock port of the D-FF section 50 acquires the stop signal SS from the instructing section 36. The output port of the D-FF section 50 is connected to the switch 58. The output port of the D-FF section 50 maintains the input of the data port at the rising of the stop signal SS input to the clock port, and outputs the result to the switch 58. Here, when the control current is zero, the stop signal SS rises, and therefore the D-FF section 50 constantly outputs the designation signal MS designating the conductive mode to the switch 58.

The delaying section 52 is connected to the instructing section 36. The delaying section 52 acquires the stop signal SS from the instructing section 36. The delaying section 52 outputs to the NOT circuit 54 a delayed signal DS obtained by delaying the stop signal SS by a predetermined delay time Δt. The delay time Δt is shorter than the time during which the stop signal SS is low level, i.e. the time during which the control current is to be zero. For example, the delay time Δt is a time during which the current flowing in the coil 90 can reach zero due to the regenerative state. The delay time Δt is preferably longer, and not shorter, than the time during which the current flowing in the coil 90 can reach zero due to the regenerative state.

The NOT circuit 54 is connected to the delaying section 52. The NOT circuit 54 acquires the delayed signal DS that is delayed by the delaying section 52. The NOT circuit 54 outputs an inverted delayed signal ADS obtained by inverting the delayed signal DS.

The AND circuit 56 is connected to the instructing section 36 and the NOT circuit 54. The AND circuit 56 acquires the stop signal SS from the setting section 14, acquires the inverted delayed signal ADS from the NOT circuit 54, and outputs the AND of these signals. When the stop signal SS and the inverted delayed signal ADS are both high level, the AND circuit 56 outputs a switch signal CS with a high level. Accordingly, the AND circuit 56 outputs the switch signal CS with a high level during a time period of the delay time Δt from when the stop signal SS is acquired, and outputs the switch signal CS with a low level at all other times.

The switch 58 is connected to the AND circuit 56. The switch 58 acquires the switch signal CS from the AND circuit 56. The switch 58 switches the connection destination of the driving section 34 between the instructing section 36 and the D-FF section 50, according to the switch signal CS. When the switch signal CS with a high level is acquired, the switch 58 connects the output port of the D-FF section 50 and the driving section 34. When the switch signal CS with a low level is acquired, the switch 58 connects the instructing section 36 and the driving section 34. Accordingly, the switch 58 connects the driving section 34 to the D-FF section 50 during a time period of the delay time Δt from when the stop signal SS is input, and connects the driving section 34 to the instructing section 36 at all other times. Therefore, during the time period of the delay time Δt from when the stop signal SS is input, the delay control section 32 outputs a designation signal of the conductive mode held by the D-FF section 50 to the driving section 34, and after the delay time Δt has passed from when the stop signal SS is input, outputs the designation signal of the stop mode to the driving section 34. As a result, the delay control section 32 delays the designation signal MS that designates the stop mode by the delay time Δt, and then outputs this signal to the driving section 34.

Figure 4:
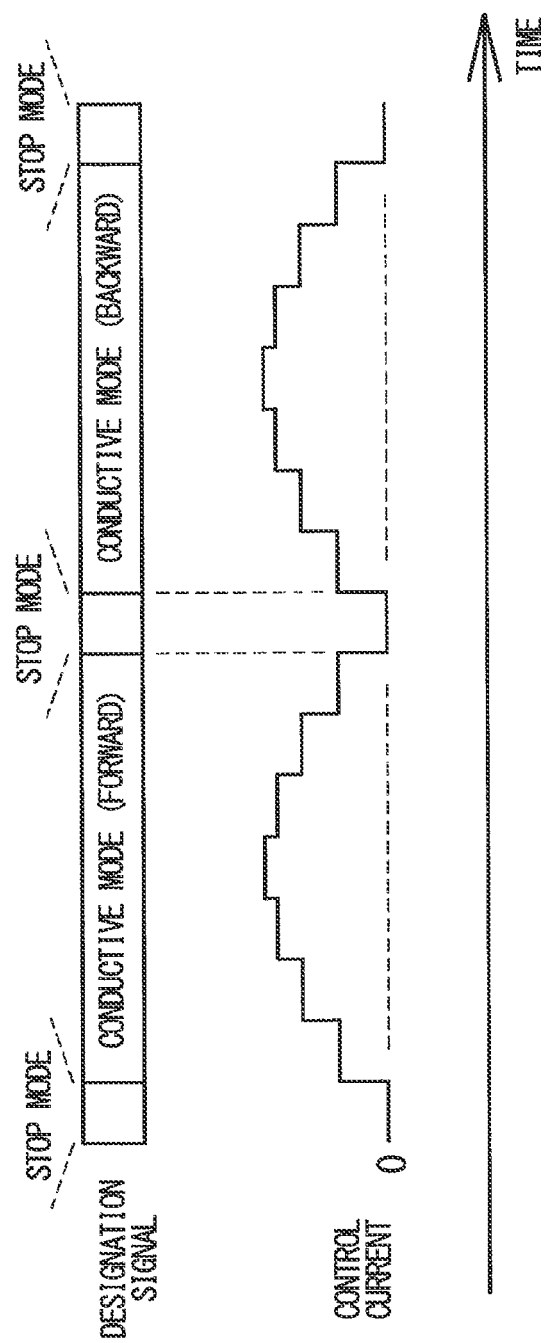
FIG. 4 shows the relationship between the control current and the designation signal MS output by the setting section 14.

FIG. 4 shows the relationship between the control current and the designation signal MS output by the setting section 14. The horizontal axis of FIG. 4 indicates time. The upper portion of FIG. 4 shows the designation signal MS output by the setting section 14. The bottom portion of FIG. 4 shows the control current output by the setting section 14. As shown in FIG. 4, when the control current is not zero, the setting section 14 outputs the designation signal MS designating the conductive mode. While the control current is zero, the setting section 14 outputs the designation signal MS designating the stop mode.

Figure 5:
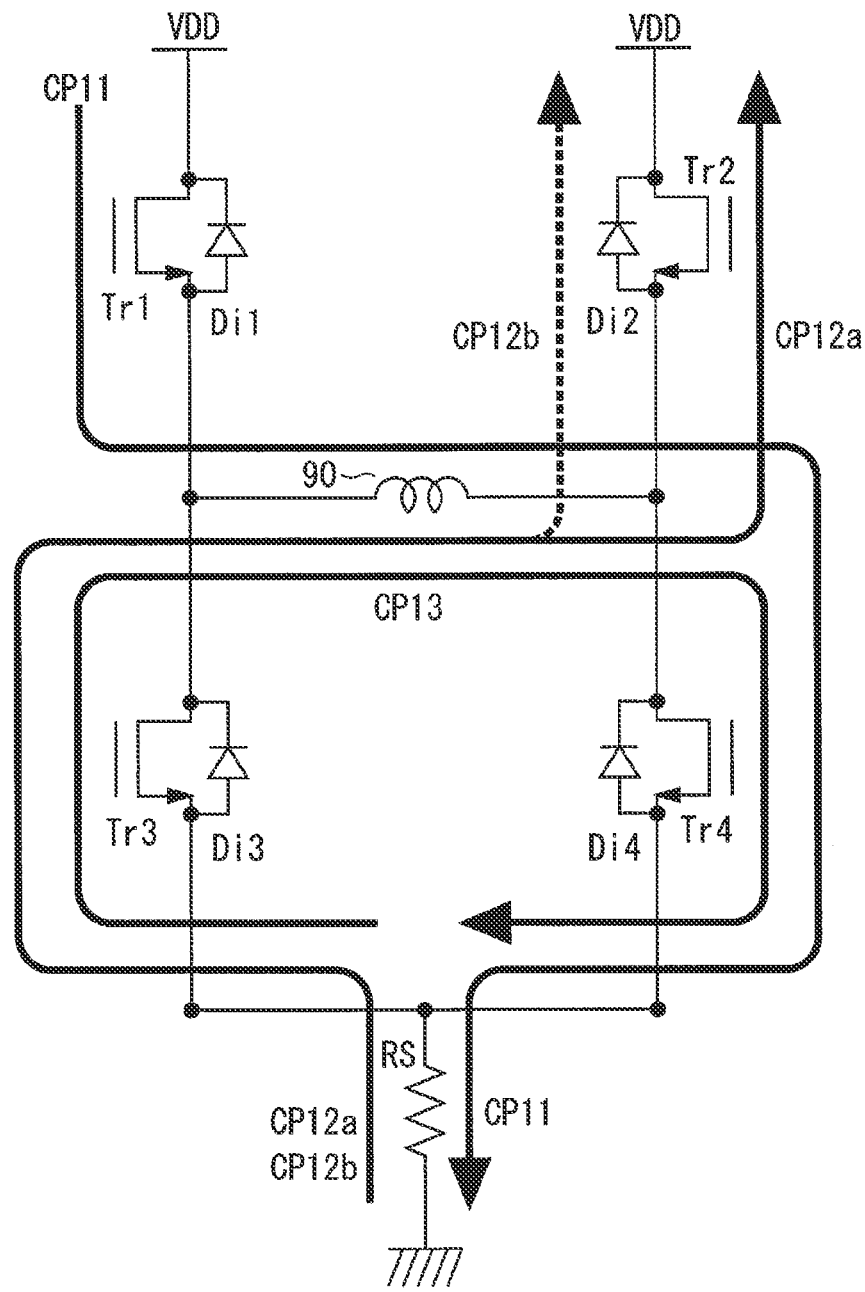
FIG. 5 is a drawing for describing the current path in the forward direction mode of the conductive mode.

FIG. 5 is a drawing for describing the current path in the forward direction mode of the conductive mode. The forward direction mode of the conductive mode includes a drive state, a regenerative state, and a braking state. In the drive state, the driving section 34 sets the transistors Tr1 and Tr4 to the ON state and sets the transistors Tr2 and Tr3 to the OFF state. As a result, in the drive state, the current flows along the current path CP 11 from the power supply through the transistor Tr1, the coil 90, the transistor Tr4, and the sense resistor 24, in the stated order. In the drive state, the current flowing through the coil 90 also flows through the sense resistor 24, and therefore it is possible to measure the current flowing through the coil 90 based on the voltage of the sense resistor 24. In the regenerative state, the driving section 34 sets the transistors Tr3 and Tr2 to the ON state and sets the transistors Tr1 and Tr4 to the OFF state. In this regenerative state, the current flows along the current path CP 12a through the sense resistor 24, the transistor Tr3, the coil 90, and the transistor Tr2, in the stated order. In the regenerative state, the driving section 34 may instead set the transistor Tr3 to the ON state and the transistor Tr2 to the OFF state. In this regenerative state, the current flows along the current path CP 12b through the sense resistor 24, the transistor Tr3, the coil 90, and the parasitic diode Di2 of the transistor Tr2, in the stated order. Therefore, in the regenerative state, the current flowing through the coil 90 decreases rapidly. In the regenerative state, in consideration of restricting heating of the motor or the like, the current preferably flows along the current path CP 12a including the transistor Tr2 with a low resistance. In the braking state, the driving section 34 sets the transistors Tr3 and Tr4 to the ON state and sets the transistors Tr1 and Tr2 to the OFF state. As a result, in the braking state, the current flows along the current path CP 13 through the transistor Tr3, the coil 90, and the transistor Tr4, in the stated order. Therefore, in the braking state, the current flowing through the coil 90 decreases slowly, as a result of loss caused by circulation of the current.

Figure 6:
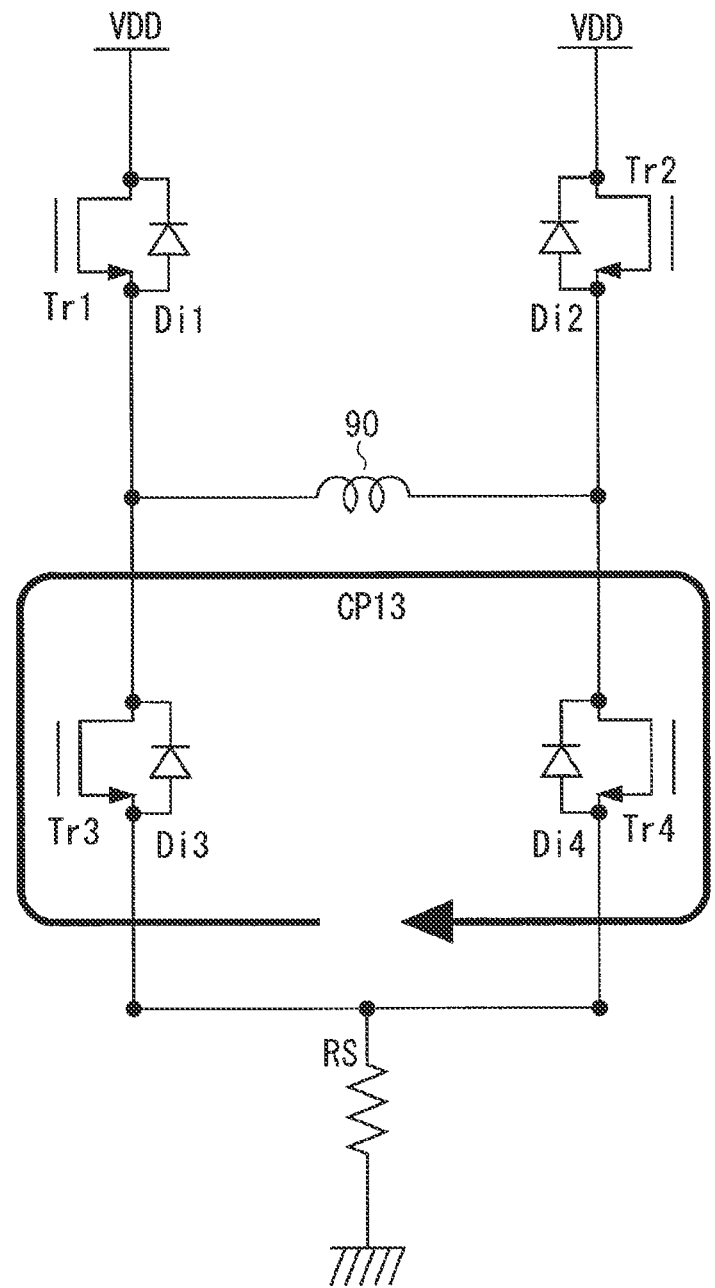
FIG. 6 is a drawing for describing the current path in the stop mode after the forward direction mode.

FIG. 6 is a drawing for describing the current path in the stop mode after the forward direction mode. The stop mode includes a braking state. In the braking state, the transistors Tr3 and Tr4 are set to the ON state. As a result, the current flows along the current path CP 13 through the transistor Tr3, the coil 90, and the transistor Tr4, in the stated order. Therefore, in the braking state, the current flowing through the coil 90 gradually decreases until reaching zero.

Figure 7:
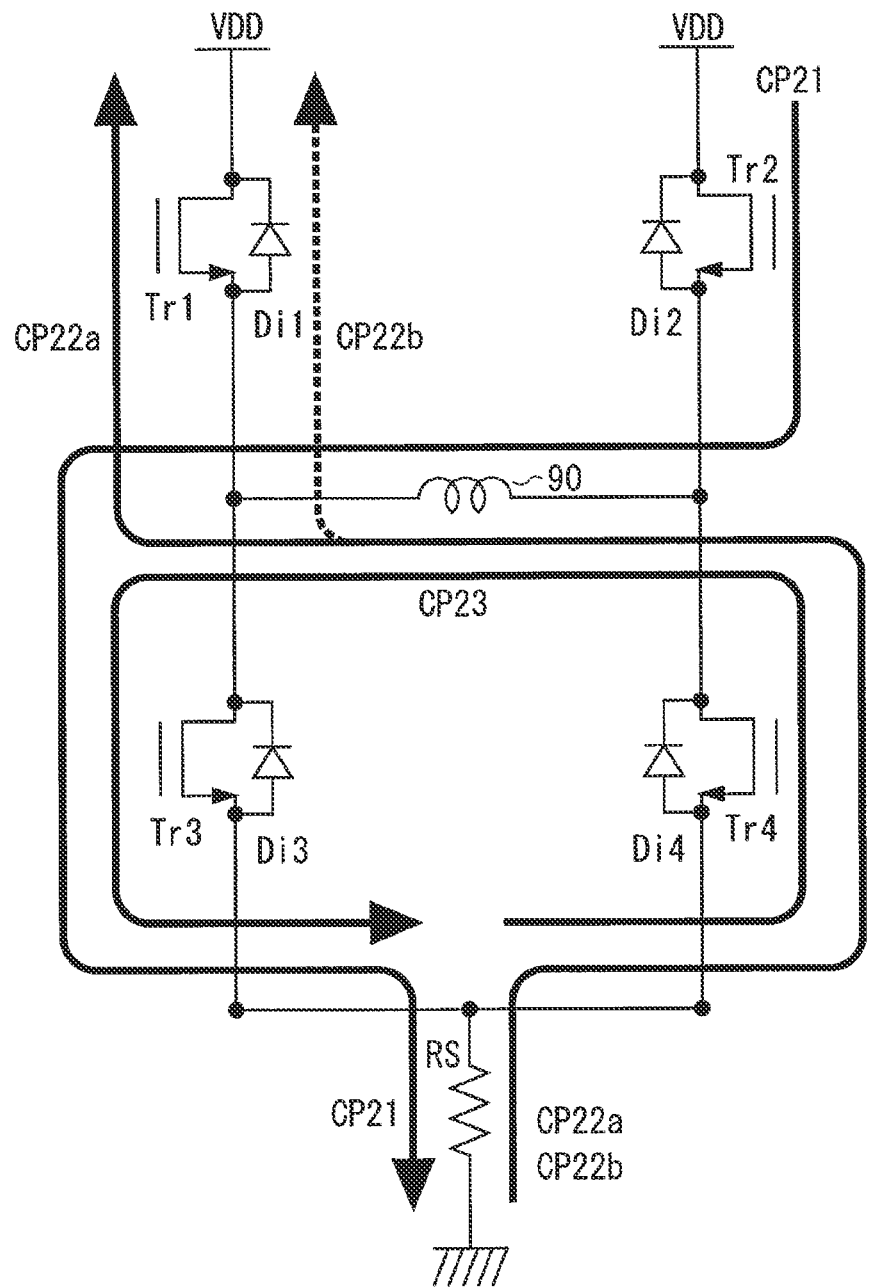
FIG. 7 is a drawing for describing the current path in the backward direction mode of the conductive mode.

FIG. 7 is a drawing for describing the current path in the backward direction mode of the conductive mode. The backward direction mode is a mode in which, after the current flows in the forward direction during the forward direction mode, when the rotational direction of the motor is maintained and the motor is made to rotate in the same direction as in the forward direction mode, the current flowing through the coil 90 is in a direction opposite the current direction in the forward direction mode. The backward direction mode of the conductive mode includes a drive state, a regenerative state, and a braking state. In the drive state, the driving section 34 sets the transistors Tr2 and Tr3 to the ON state. As a result, in the drive state, the current flows along the current path CP 21 from the power supply through the transistor Tr2, the coil 90, the transistor Tr3, and the sense resistor 24, in the stated order. In the regenerative state, the driving section 34 sets the transistors Tr1 and Tr4 to the ON state. In this regenerative state, the current flows along the current path CP 22a through the sense resistor 24, the transistor Tr4, the coil 90, and the transistor Tr1, in the stated order. In the regenerative state, the driving section 34 may instead set the transistor Tr4 to the ON state and set the transistor Tr1 to the OFF state. In this regenerative state, the current flows along the current path CP 22b through the sense resistor 24, the transistor Tr4, the coil 90, and the parasitic diode Di1 of the transistor Tr1, in the stated order. In the braking state, the driving section 34 sets the transistors Tr3 and Tr4 to the ON state. As a result, in the braking state, the current flows along the current path CP 23 through the transistor Tr4, the coil 90, and the transistor Tr3, in the stated order.

Figure 8:
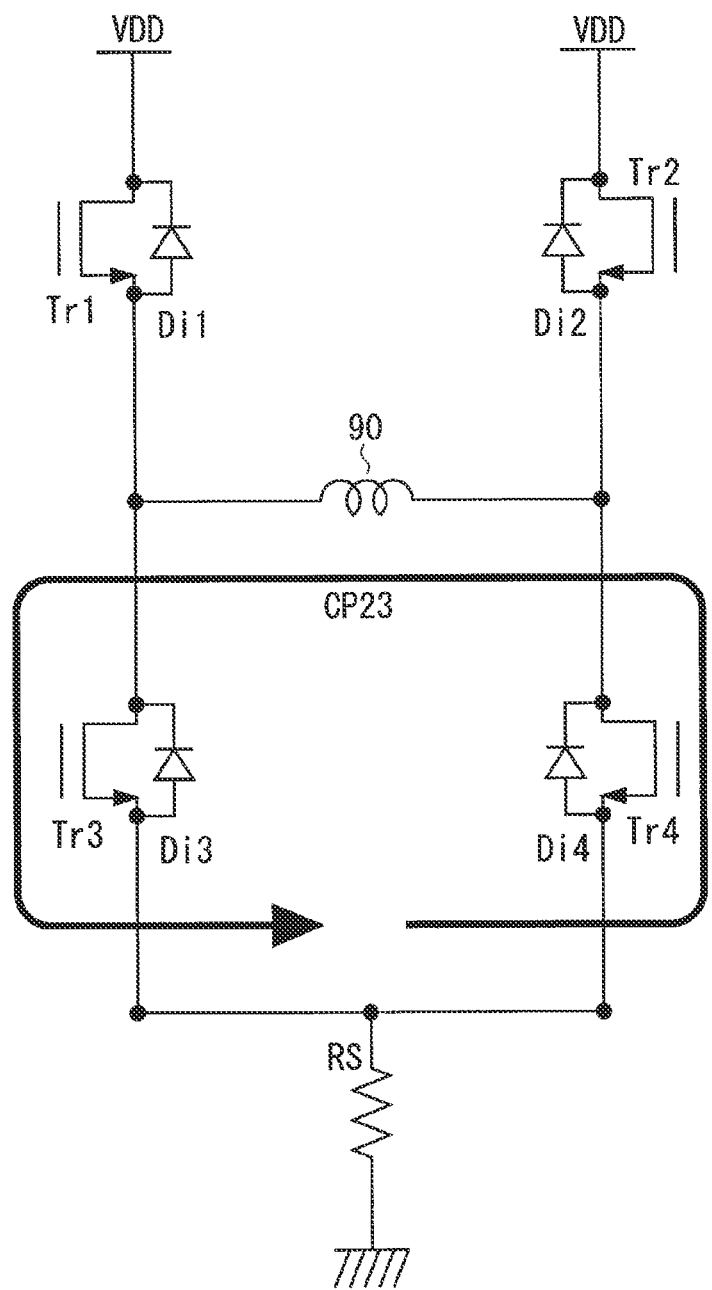
FIG. 8 is a drawing for describing the current path in the stop mode after the backward direction mode.

FIG. 8 is a drawing for describing the current path in the stop mode after the backward direction mode. As shown in FIG. 8, the stop mode includes a braking state. In the braking state, the transistors Tr3 and Tr4 are set to the ON state. As a result, the current flows along the current path CP 23 through the transistor Tr4, the coil 90, and the transistor Tr3, in the stated order.

Figure 9:
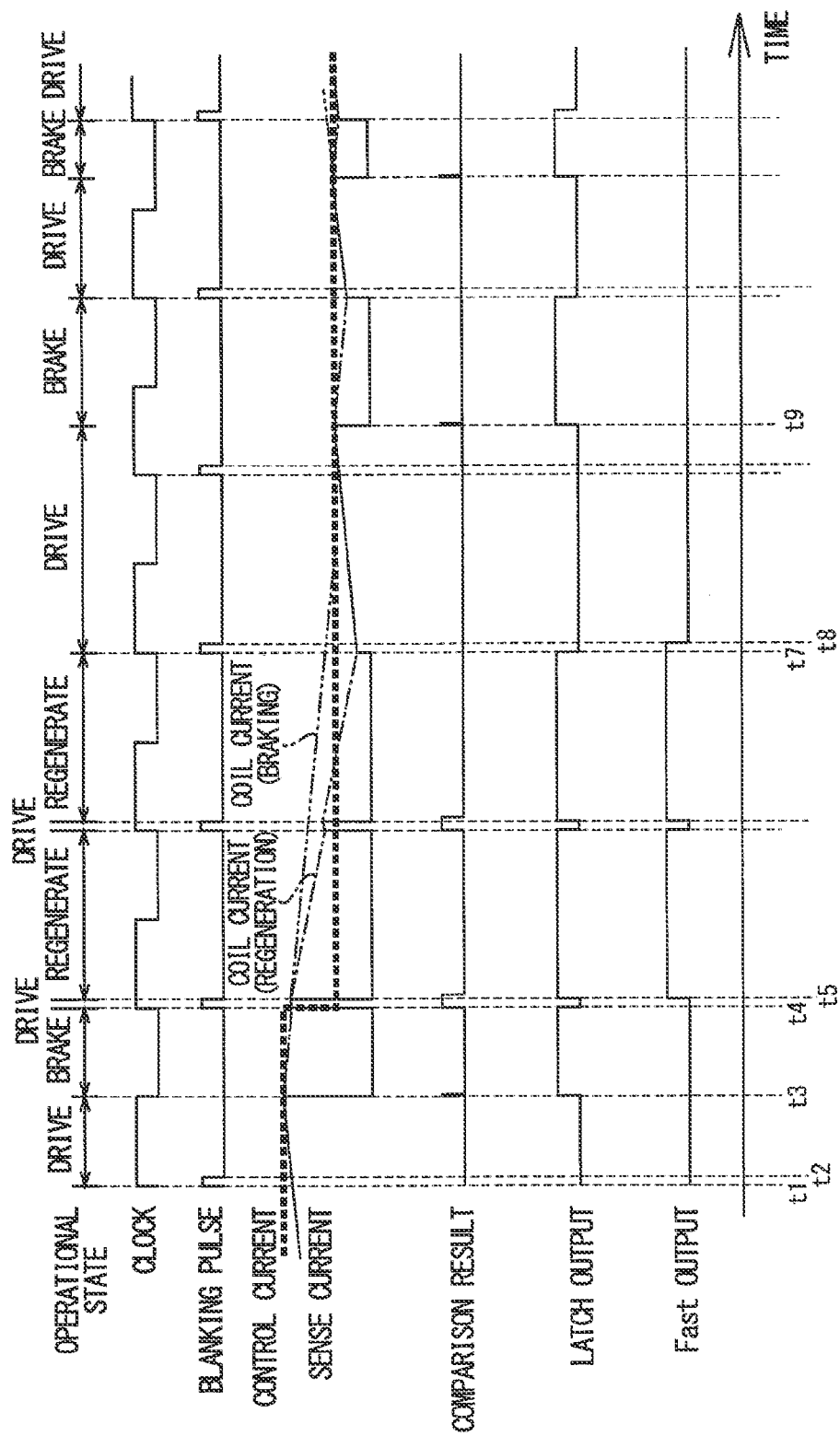
FIG. 9 is a timing chart for the conductive mode.

FIG. 9 is a timing chart for the conductive mode. The conductive mode shown in FIG. 9 is the forward direction mode. The uppermost stage of FIG. 9 shows each of the drive state, the regenerative state, and the braking state among the operational states. The second stage from the top shows the clock CLK output by the clock output section 12. The third stage from the top shows the blanking pulse BP output by the one-shot section 40. The fourth stage from the top shows the sense current (solid line) flowing through the sense resistor 24 and the control current (thick dashed line) corresponding to the control current value output by the setting section 14. Furthermore, the fourth stage from the top shows the regenerative current (single-dashed line) flowing through the coil 90 in the regenerative state and the braking current (double-dashed line) flowing through the coil 90 in the braking state. The fifth stage from the top shows the comparison result CR output by the comparing section 18. The sixth stage from the top shows the latch output LO output by the SR latch section 42. The seventh stage from the top shows the Fast output FO output by the AND circuit 48.

As shown in FIG. 9, when the clock output section 12 outputs the clock CLK, the one-shot section 40 outputs the blanking pulse BP with a high level that is shorter than the high level of the clock CLK, in accordance with the rising of the clock CLK.

From the time t1 to the time t2, during which the blanking pulse BP is in a high level state, the SR latch section 42 outputs the latch output LO with a low level. Therefore, the driving section 34 drives the transistors Tr1 to Tr4 in the drive state. As a result, as shown in FIG. 5, the current flows along the current path CP 11 including the coil 90. Accordingly, it is possible to measure the current flowing through the coil 90 based on the voltage of the sense resistor 24.

After the time t2 at which the blanking pulse BP stops being high level, the fact that the latch output LO is maintained at a low level indicates that even when the current flows in the drive state while the blanking pulse BP is high level, the sense current is less than the control current. In this case, even after the blanking pulse BP stops being high level, the driving section 34 controls the transistors Tr1 to Tr4 in the drive state to cause the current to flow through the coil 90.

After this, at the time t3, the sense current that has increased as a result of the drive state becomes greater than or equal to the control current, such that the comparison result CR obtained by the Set port of the SR latch section 42 becomes high level. At the time t3, the blanking pulse BP obtained by the Reset port of the SR latch section 42 is low level, and therefore the SR latch section 42 outputs the latch output LO with a high level. Furthermore, at the time t3, the AND circuit 48 outputs the Fast output FO with a low level, and therefore the driving section 34 drives the transistors Tr1 to Tr4 in the braking state. In this way, the driving section 34 switches from the drive state to the braking state out of synchronization with the clock CLK. As a result, as shown in FIG. 5, the current flows along the current path CP 13 including the coil 90. Therefore, the sense current that has become greater than or equal to the control current gradually decreases. After this, until the next blanking pulse BP is input to the SR latch section 42 at the time t4, the latch output LO is maintained at a high level and the Fast output FO is maintained at a low level, and therefore the driving section 34 maintains the braking state. Since the sense current cannot be measured in the braking state, the sense current becomes zero.

At the time t4, when the Reset port of the SR latch section 42 acquires the blanking pulse BP, the latch output LO is reset to a low level. As a result, the driving section 34 drives the transistors Tr1 to Tr4 in the drive state.

At the time t5, when the inverted blanking pulse ABP rises, i.e. when the blanking pulse BP falls, the D-FF section 46 outputs to the AND circuit 48, as the FF output FF, the comparison result with the high level input to the data port. The comparison result CR is maintained at a high level for a very short time from the time t5. Furthermore, at the time t5, the inverted blanking pulse ABP is high level, and therefore the AND circuit 48 outputs the Fast output FO with a high level. Therefore, the driving section 34 controls the transistors Tr1 to Tr4 in the regenerative state. As a result, as shown in FIG. 5, the current flows along the current path CP 12a including the coil 90. The driving section 34 may instead control the current to flow along the current path CP 12b.

As shown by the single-dashed line, from the time t5 and onward during which the sense current is greater than the control current, the driving section 34 can increase the magnitude of the decrease in the current of the coil by performing control in the regenerative state. Therefore, the driving section 34 can quickly cause the current in the coil to become less than or equal to the control current. On the other hand, as shown by the double-dashed line, from the time t5 and onward during which the sense current is greater than the control current, when the driving section 34 performs control in the braking state, the magnitude of the decrease in the current of the coil is small, and therefore a longer time is necessary for the current of the coil to become less than or equal to the control current.

After this, at the time t7, the driving section 34 resets the latch output LO to be low level together with the rising of the blanking pulse BP, and therefore performs control in the drive state. Next, at the time t8 when the inverted blanking pulse ABP falls, the comparison result CR is low level, and therefore the latch output LO is maintained at a low level. Therefore, the driving section 34 maintains the drive state even after the blanking pulse BP becomes low level. As a result, the current of the coil gradually increases.

At the time t9, when the sense current becomes greater than or equal to the control current, the comparison result becomes high level and the latch output LO is set to high level, and therefore the driving section 34 controls the transistors Tr1 to Tr4 in the braking state.

After this, in the conductive mode, the control described above is repeated.

Figure 10:
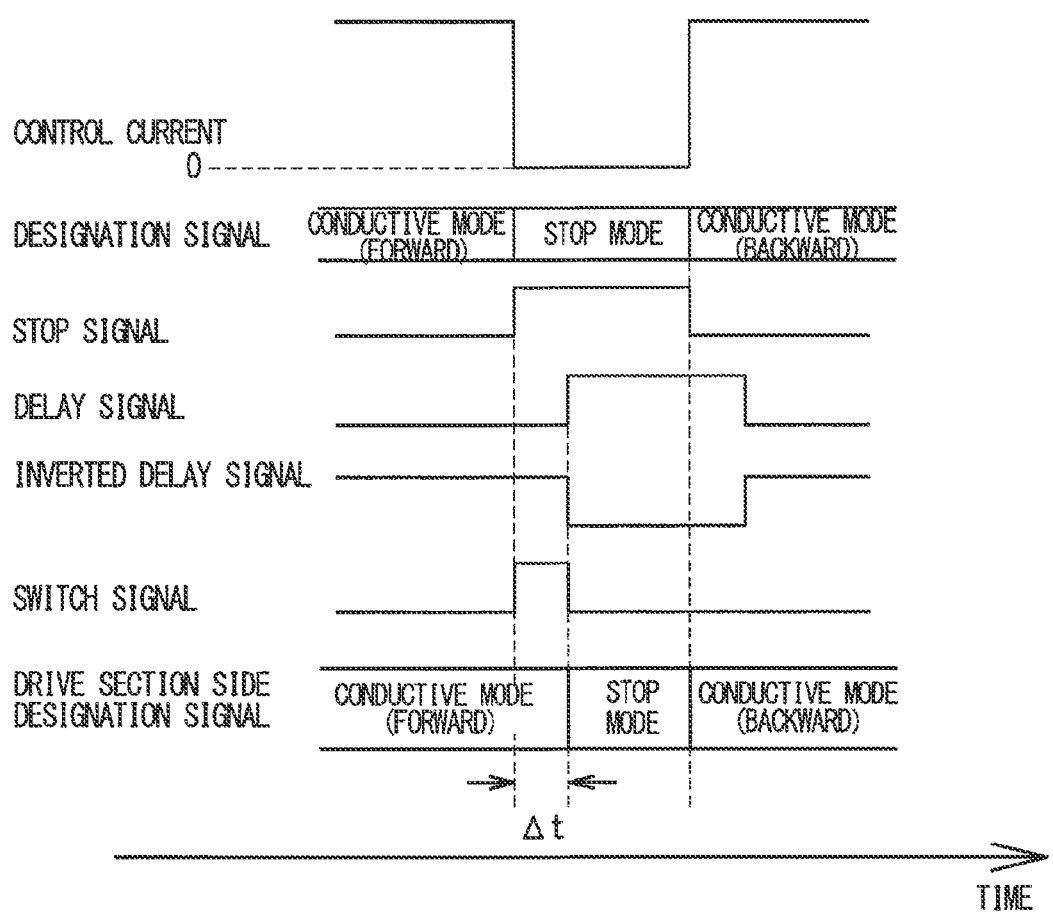
FIG. 10 is a timing chart for the stop mode.

FIG. 10 is a timing chart for the stop mode. The uppermost stage of FIG. 10 shows the control current. The second stage from the top shows the designation signal MS output by the instructing section 36. The third stage from the top shows the stop signal SS output by the instructing section 36. The fourth stage from the top shows the delayed signal DS output by the delaying section 52. The fifth stage from the top shows the inverted delayed signal ADS output by the NOT circuit 54. The sixth stage from the top shows the switch signal CS output by the AND circuit 56. The seventh stage from the top shows the designation signal MSO output by the setting section 14.

The stop signal SS is low level until the control current reaches zero, and therefore the AND circuit 56 outputs the switch signal CS with a low level. Therefore, the switch 58 connects the instructing section 36 and the driving section 34 directly. Accordingly, until the control current reaches zero, the instructing section 36 outputs the designation signal MS directly to the driving section 34.

When the control current becomes zero, the instructing section 36 outputs the designation signal MS that designates the stop mode and also outputs the stop signal SS with a high level to the clock port of the D-FF section 50, as shown in the third stage from the top in FIG. 10. When the stop signal SS rises, the designation signal MS that designates the conductive mode is still being input to the data port of the D-FF section 50, and therefore the D-FF section 50 outputs the designation signal MS designating the conductive mode being maintained after the stop signal SS rises.

Upon acquiring the stop signal SS from the instructing section 36, the delaying section 52 outputs to the NOT circuit 54 the delayed signal DS obtained by delaying this stop signal SS by the delay time Δt, as shown in the fourth stage from the top in FIG. 10. Upon acquiring the delayed signal DS from the delaying section 52, the NOT circuit 54 inputs to one of the inputs of the AND circuit 56 the inverted delayed signal ADS obtained by inverting the delayed signal DS, as shown in the fifth stage from the top in FIG. 10. The other input of the AND circuit 56 acquires the stop signal SS directly from the instructing section 36. Accordingly, both inputs of the AND circuit 56 are high level for the time period of the delay time Δt from when the stop signal SS becomes high level. Therefore, the output of the AND circuit 56 is high level for the time period of the delay time Δt from when the stop signal SS becomes high level. As a result, the switch 58 connects the driving section 34 and the D-FF section 50 for the time period of the delay time Δt.

Therefore, even when the control current becomes zero and the instructing section 36 outputs the designation signal MS designating the stop mode, the driving section 34 continues to acquire the designation signal MS that is maintained and output by the D-FF section 50, which is the designation signal MS designating the conductive mode prior to the designation of the stop mode, during the time period of the delay time Δt. Accordingly, the driving section 34 drives the coil 90 while continuing the conductive mode designated prior to the designation of the stop mode, and therefore the current of the coil 90 is controlled according to the drive state, the regenerative state, or the braking state, as shown in FIG. 5, for example. In particular, since the control current is zero, the driving section 34 performs control in the regenerative state until the delay time Δt has passed. In this way, the driving section 34 can quickly cause the current flowing through the coil 90 to become close to zero.

When the delay time Δt has passed, the delaying section 52 outputs the delayed signal DS with a high level, and therefore the NOT circuit 54 outputs the inverted delayed signal ADS with a low level. Therefore, one input of the AND circuit 56 is low level, and so the AND circuit 56 outputs the switch signal CS with a low level. Accordingly, the switch 58 directly connects the instructing section 36 and the driving section 34, and therefore the driving section 34 acquires the designation signal MS designating the stop mode output by the instructing section 36. As a result, the driving section 34 switches from the conductive mode to the stop mode, and therefore controls the current of the coil 90 according to the braking state shown in FIG. 6. After this, the driving section 34 acquires the designation signal MS output by the instructing section 36 without a delay, and therefore the end of the designation signal MS designating the stop mode is also acquired without a delay. As a result, when the instructing section 36 ends the designation signal MS designating the stop mode, the driving section 34 ends the stop mode without a delay.

Figure 11:
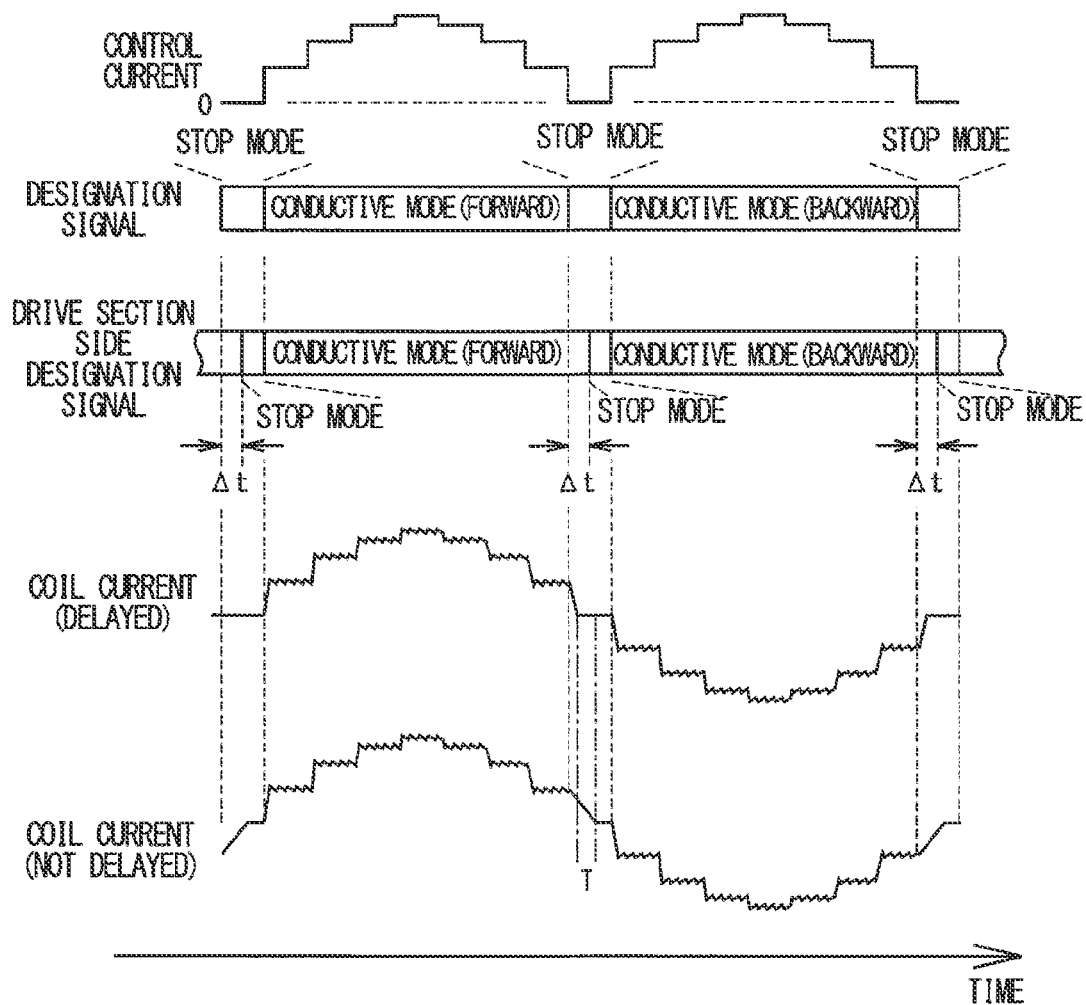
FIG. 11 shows the relationship between the current mode and the current flowing through the coil 90.

FIG. 11 shows the relationship between the current mode and the current flowing through the coil 90. The uppermost stage in FIG. 11 shows the control current output by the instructing section 36. The second stage from the top shows the designation signal MS output by the instructing section 36. The third stage from the top shows the designation signal MS output by the driving section 34. The fourth stage from the top shows the current flowing through the coil 90 in a case where the designation signal MS designating the stop mode according to the present embodiment is delayed. The fifth stage from the top shows the current flowing through the coil 90 in a case where the designation signal MS designating the stop mode is not delayed.

As shown in FIG. 11, when the control current becomes zero, the instructing section 36 outputs the designation signal MS designating the stop mode, and the driving section 34 acquires the designation signal MS designating the stop mode after the delay time $\Delta t$ has passed. Accordingly, until the delay time $\Delta t$ has passed from when the control current becomes zero, the driving section 34 causes current to flow through the coil 90 in the regenerative state of the conductive mode. As a result, as shown in the fourth stage from the top in FIG. 11, the driving section 34 can quickly set the current of the coil to be zero.

On the other hand, when the driving section 34 acquires the designation signal MS designating the stop mode output by the instructing section 36 without a delay, the driving section 34 switches from the conductive mode to the stop mode at the same time that the control current reaches zero. Accordingly, in the stop mode, the current flows through the coil 90 according to the braking state, and therefore, compared to a case in which the stop mode is delayed such as in the present embodiment, the time needed for the current flowing through the coil 90 to reach zero is a time T longer than in a case where there is a delay.

In a case where the delay time $\Delta t$ is long, if the path of the regenerative current flowing in the regenerative state within the delay time $\Delta t$ is the circuit path CP 12a of FIG. 5 or the circuit path CP 22a of FIG. 7, there are cases where the current of the coil flows backwards and becomes negative. Therefore, upon receiving the designation signal designating the stop mode, the driving section 34 may turn OFF the transistors that are not in the path of the regenerative current in the regenerative state selected within the delay time $\Delta t$ and turn OFF the transistors on the power supply side of the path of the regenerative current, thereby realizing a regenerative state in which a portion of the path of the regenerative current has a parasitic diode connected in parallel to a transistor on the power supply side of the path of the regenerative current. For example, in the regenerative state occurring after receiving a designation signal designating the stop mode while in the forward direction mode, the transistors Tr1 and Tr4 that are outside the path of the regenerative current are turned OFF, the transistor Tr3 is turned ON, and the transistor Tr2 on the power supply side of the path of the regenerative current is turned OFF, thereby realizing a regenerative state in which a portion of the path of the regenerative current has the parasitic diode Di2 connected in parallel with the transistor Tr2 on the power supply side of the path of the regenerative current.

On the other hand, in a regenerative state selected when a designation signal designating the conductive mode is received, a regenerative state may be realized in which all of the transistors in the path of the regenerative current are turned ON and all of the transistors outside of the path of the regenerative current are turned OFF. For example, in a regenerative state selected when a designation signal designating the forward direction mode of the conductive mode is received, the drive section 34 may realize a regenerative state in which all of the transistors Tr2 and Tr3 in the path of the regenerative current are turned ON while the transistors Tr1 and Tr4 that are not in the path of the regenerative current are turned OFF.

When the designation signal designating the stop mode is received, the driving section 34 may turn OFF a transistor on the side opposite the power supply in the path of the regenerative current flowing in the regenerative state selected within the delay time $\Delta t$ to realize a regenerative state in which a portion of the path of the regenerative current has a diode connected in parallel with a transistor on the side opposite the power supply in the path of the regenerative current, and a regenerative state in which a transistor on the side opposite the power supply in the path of the regenerative current is turned ON in the regenerative state selected when a designation signal designating the conductive mode is received. A transistor on a side opposite the power supply is a transistor that is opposite the power supply in a manner to sandwich the coil 90, for example. As an example, in the regenerative state after receiving the designation signal designating the stop mode while in the forward direction mode, the driving section 34 may turn ON the transistor Tr2 and turn OFF the transistor Tr3 that is on the opposite side of the power supply in the path of the regenerative current flowing in the regenerative state selected within the delay time $\Delta t$, to realize a regenerative state in which a portion of the path of the regenerative current has the parasitic diode Di3 connected in parallel with the transistor Tr3 on the side opposite the power supply in the path of the regenerative current. Furthermore, in a regenerative state selected when the designation signal designating the conductive mode is received, the driving section 34 may realize a regenerative state in which the transistor Tr3 on the side opposite the power supply in the path of the regenerative current and the transistor Tr2 are turned ON.

In this way, in the regenerative state selected within the delay time $\Delta t$, the path of the regenerative current becomes each of the current path CP 12b and the current path CP 22b, for example, and therefore it is possible to regenerate the current through the parasitic diodes Di1 and Di2 of the transistors Tr1 and Tr2. As a result, the motor drive apparatus 10 can prevent reverse current. Furthermore, by setting the current path in the regenerative state to be the current path CP 12b and the current path CP 22b during the time period of the delay time $\Delta t$ and setting the current path in the regenerative state during the conductive mode to be the current path CP 12a and the current path CP 22a during all times other than during the delay time $\Delta t$, it is possible to prevent reverse current during the time period of the delay time $\Delta t$ and to minimize the power loss of the regeneration during periods other than the delay time Δt. The transistors referred to here are examples of switches.

Figure 12:
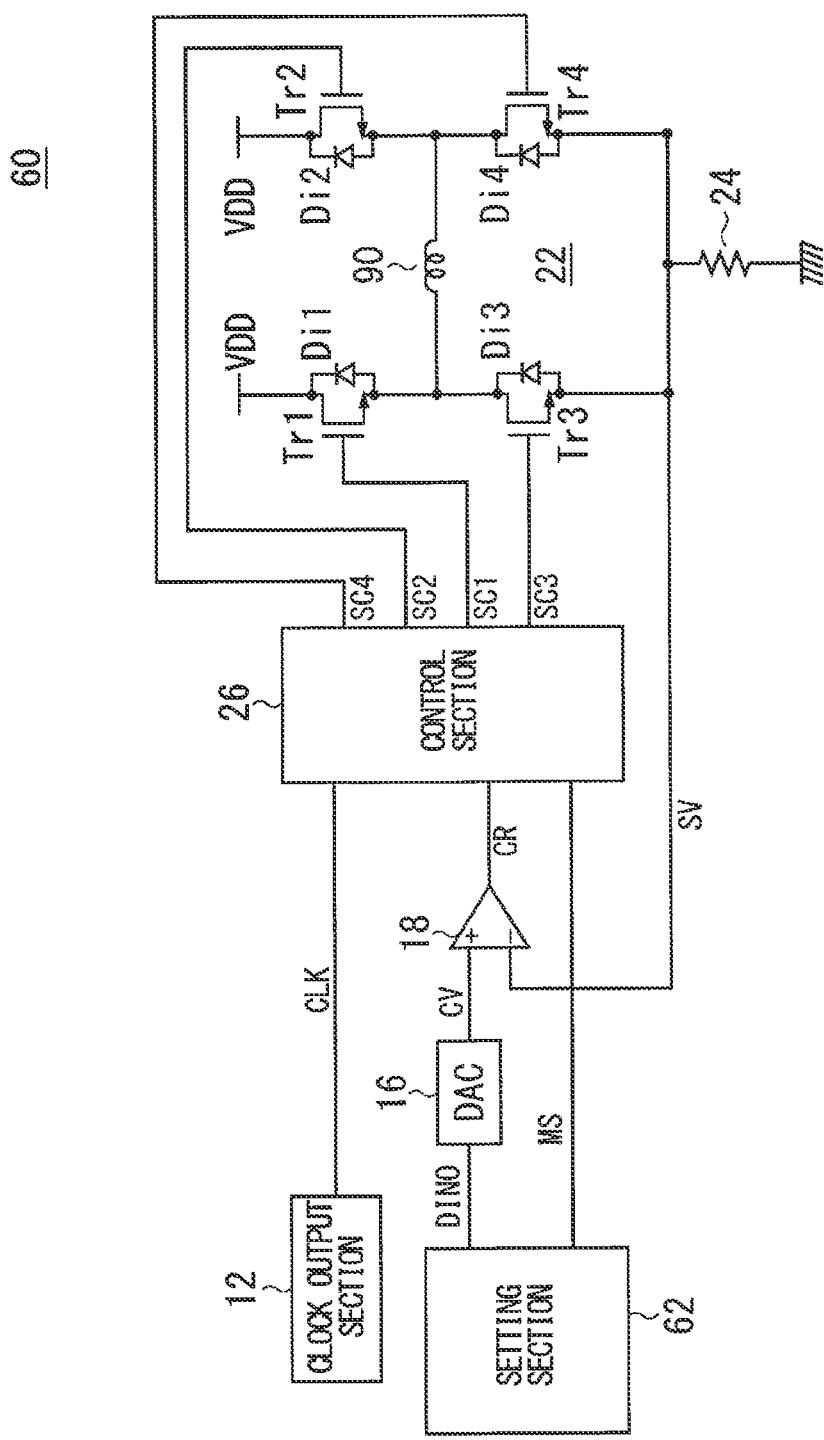
FIG. 12 is a drawing for describing the overall configuration of a motor drive apparatus 60.

FIG. 12 is a drawing for describing the overall configuration of a motor drive apparatus 60. The motor drive apparatus 60 controls the current flowing through a coil 90 for driving, such as a stepping motor. Here, the motor includes a plurality of coils 90, but for ease of explanation, FIG. 12 shows only one representative coil 90. The motor drive apparatus 60 receives a designation signal MS that designates a current mode including a conductive mode in which current flows through the coil 90 and a stop mode in which the flow of the current through the coil 90 is stopped, thereby controlling the current of the coil 90. The motor drive apparatus 60 sets the control current to zero before receiving the stop mode designation by causing the control current value DIN to be earlier by a prescribed time, thereby shortening the time until the current is stopped.

The setting section 62 is connected to the D/A converter 16. The setting section 62 outputs to the D/A converter 16 a control current value DINO. The control current value DINO is a digital value of the current flowing through the coil 90, and is used to determine which operational state is set.

The setting section 62 is connected to the control section 26. The setting section 62 outputs the designation signal MS that designates the current mode. The current mode includes the conductive mode, which has a forward direction mode and a backward direction mode, and the stop mode. The conductive mode is the mode in which the current flows through the coil 90. The stop mode is the mode in which the current flowing through the coil 90 is stopped.

Figure 13:
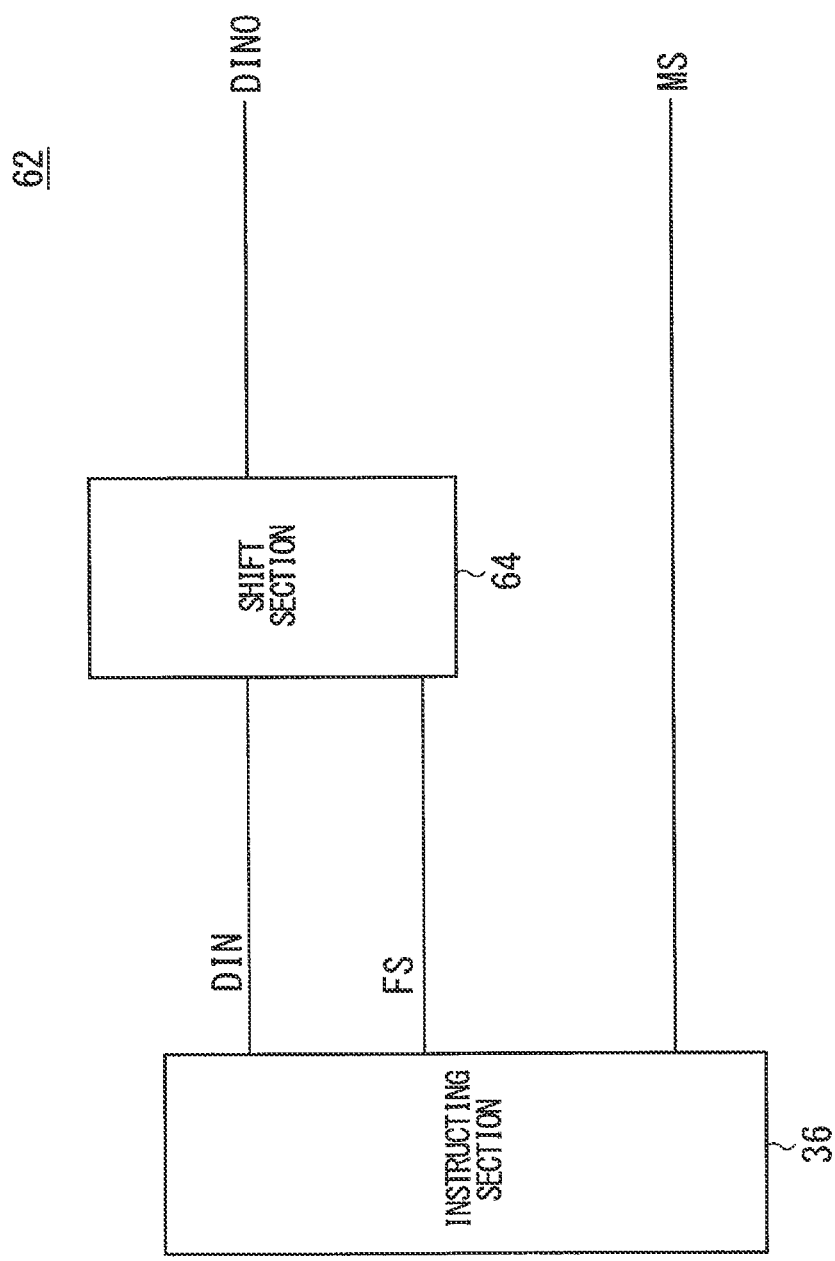
FIG. 13 is a drawing for describing the setting section 62.

FIG. 13 is a drawing for describing the setting section 62. As shown in FIG. 13, the setting section 62 includes an instructing section 36 and a shift section 64.

The instructing section 36 outputs a shift signal FS that is separate from the control current value DIN and causes the control current value DIN to be earlier, before the control current becomes zero. The instructing section 36 outputs the shift signal FS with a high level before the control current becomes zero.

The shift section 64 is connected to the instructing section 36. While the control current value DIN with a value that is not zero is being received, the shift section 64 outputs the control current value DIN to the D/A converter 16 without causing the control current value DIN to be earlier. The shift section 64 causes the control current value DIN to be earlier immediately before receiving a control current of zero.

The shift section 64 is connected to the instructing section 36. The shift section 64 acquires the shift signal FS from the instructing section 36. The shift section 64 outputs to the D/A converter 16 a control current value DINO of 0, at a time that is a predetermined early time Δt earlier than a segment in which the control current value DIN becomes zero. In other words, the shift section 64 causes the beginning of the period during which the control current is zero to be earlier. The shift section 64 does not cause the end of the period during which the control current is zero to be earlier. The early time Δt is shorter than the time during which the control current is to be zero. The early time Δt is a time during which the current flowing through the coil 90 can reach zero in the regenerative state. The early time Δt is preferably longer, and not shorter, than the time during which the current flowing through the coil 90 can reach zero in the regenerative state. The shift section 64 may change the early time Δt that causes the start of the period during which the control current is zero to be earlier.

As a result, the setting section 62 outputs to the D/A converter 16 the control current value DINO for a control current of zero at a time that is the early time Δt prior to the designation signal MS designating the stop mode.

Figure 14:
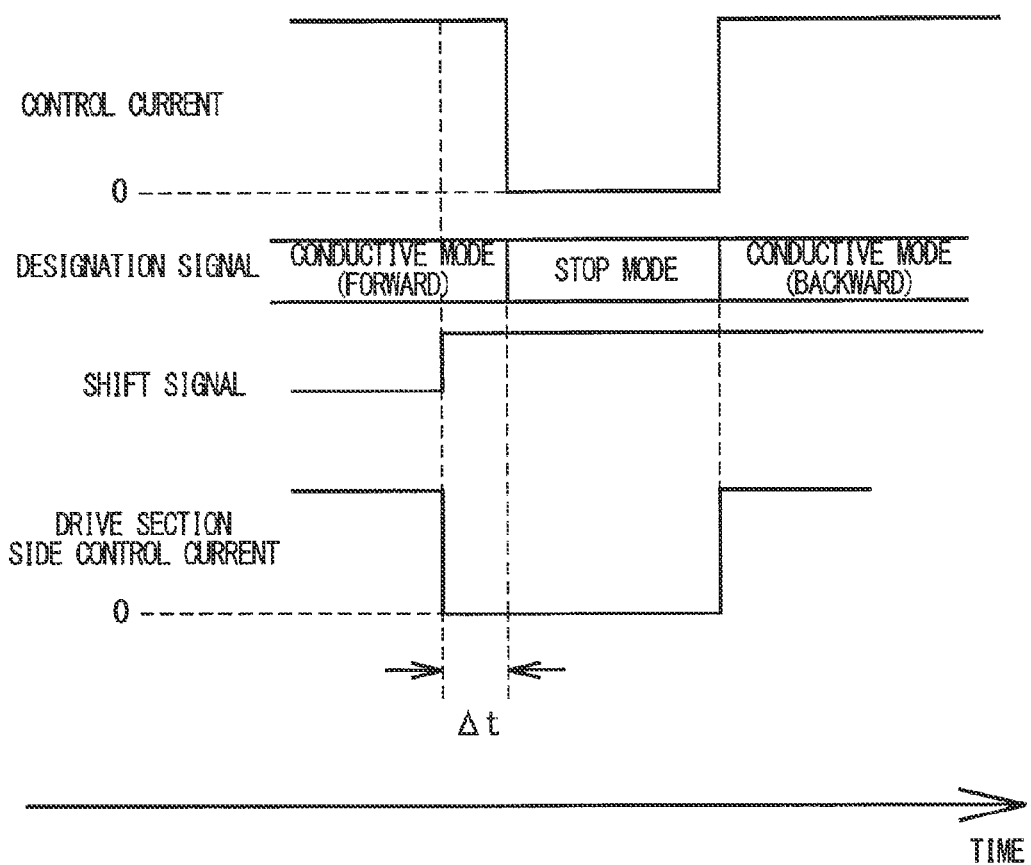
FIG. 14 is a timing chart for the stop mode.

FIG. 14 is a timing chart for the stop mode. The uppermost stage in FIG. 14 shows the control current. The second stage from the top shows the designation signal MS output by the instructing section 36. The third stage from the top shows the shift signal FS output by the instructing section 36. The fourth stage from the top shows the control current output by the shift section 64.

The shift signal FS is low level until immediately before the control current becomes zero. Accordingly, the shift section 64 outputs the control current value DIN directly to the D/A converter 16, as shown in the fourth stage from the top in FIG. 14.

When it becomes a time that is the early time Δt before when the control current becomes zero, the shift signal FS becomes high level. The time at which the control current o the driving section side becomes zero is shifted by the early time Δt from the control current shown in the uppermost stage in FIG. 14. Accordingly, as shown in the fourth stage from the top in FIG. 14, the shift section 64 outputs the driving section side control current with a value of zero to the D/A converter 16.

When the control current becomes zero, the instructing section 36 outputs the designation signal MS designating the stop mode. Accordingly, the shift section 64 outputs the control current to the D/A converter 16 as the direct driving section side control current, as shown in the fourth stage from the top in FIG. 14.

Therefore, the control current value DIN becomes zero and the instructing section 36 outputs to the D/A converter 16 the control current value DINO for which the control current becomes zero at a time that is the early time Δt earlier than when the designation signal MS designating the stop mode is output. Accordingly, the driving section 34 drives the coil 90 with a control current of zero before the designation of the stop mode, and therefore controls the current of the coil 90 according to one of the drive state, the regenerative state, and the braking state shown in FIG. 5, for example. In particular, since the control current is zero, the driving section 34 performs control in the regenerative state during the time period of the early time Δt. As a result, the driving section 34 can cause the current flowing through the coil 90 to quickly become close to zero.

When the early time Δt has passed, the driving section 34 acquires the designation signal MS designating the stop mode output by the instructing section 36. As a result, the driving section 34 switches from the conductive mode to the stop mode, and therefore performs control of the current of the coil 90 according to the braking state shown in FIG. 6. After this, the driving section 34 acquires the designation signal MS output by the instructing section 36, and therefore also acquires the end of the designation signal MS designating the stop mode. As a result, when the instructing section 36 ends the designation signal MS designating the stop mode, the driving section 34 ends the stop mode.

Figure 15:
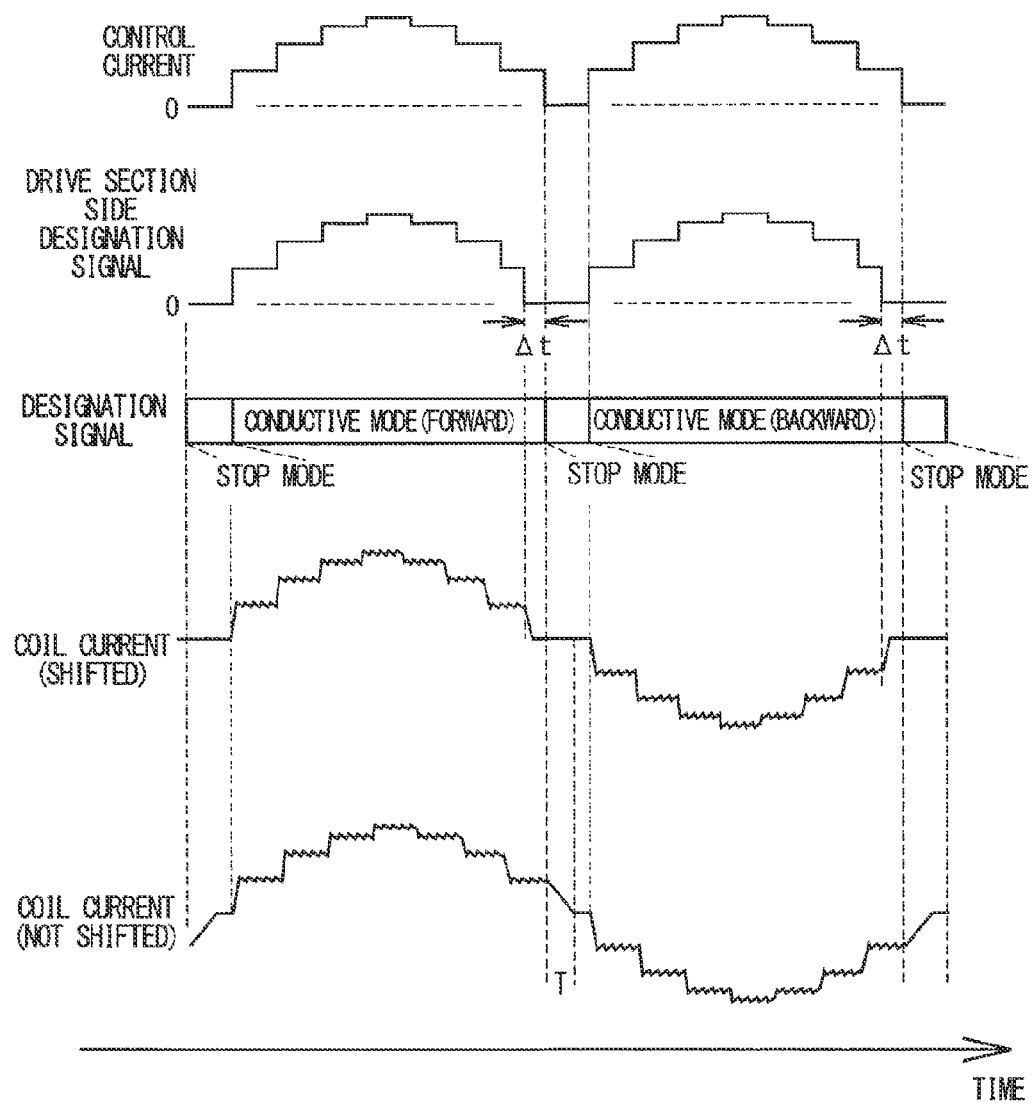
FIG. 15 shows the relationship between the current mode and the current flowing through the coil 90.

FIG. 15 shows the relationship between the current mode and the current flowing through the coil 90. The uppermost stage in FIG. 15 shows the control current output by the instructing section 36. The second stage from the top shows the control current on the driving section side output by the shift section 64. The third stage from the top shows the designation signal MS output by the instructing section 36. The fourth stage from the top shows the current flowing through the coil 90 in a case where the segment in which the control current becomes zero has been shifted according to the present embodiment. The fifth stage from the top shows the current flowing through the coil 90 in a case where the segment in which the control current becomes zero has not been shifted, as a comparison to the present embodiment.

As shown in FIG. 15, when the control current becomes zero, the instructing section 36 outputs the designation signal MS designating the stop mode, and the shift section 64 acquires a control current that becomes zero at a time that is the early time Δt before the designation signal MS designating the stop mode is output. Accordingly, at the time that is the early time Δt before the output of the designation signal MS designating the stop mode, the control current becomes zero and the driving section 34 causes current to flow through the coil 90 in the regenerative state of the conductive mode. As a result, as shown in the fourth stage from the top in FIG. 15, the driving section 34 can cause the current of the coil to quickly become zero.

On the other hand, when the driving section 34 acquires the control current output by the instructing section 36 without a shift, the driving section 34 switches from the conductive mode to the stop mode at the same time that the control current becomes zero. Accordingly, in the stop mode, the current flows through the coil 90 in the braking state, and therefore, compared to a case in which the control current is shifted such as in the present embodiment, the time needed for the current flowing through the coil 90 to reach zero is a time T longer than in a case where there is a delay.

Figure 16:
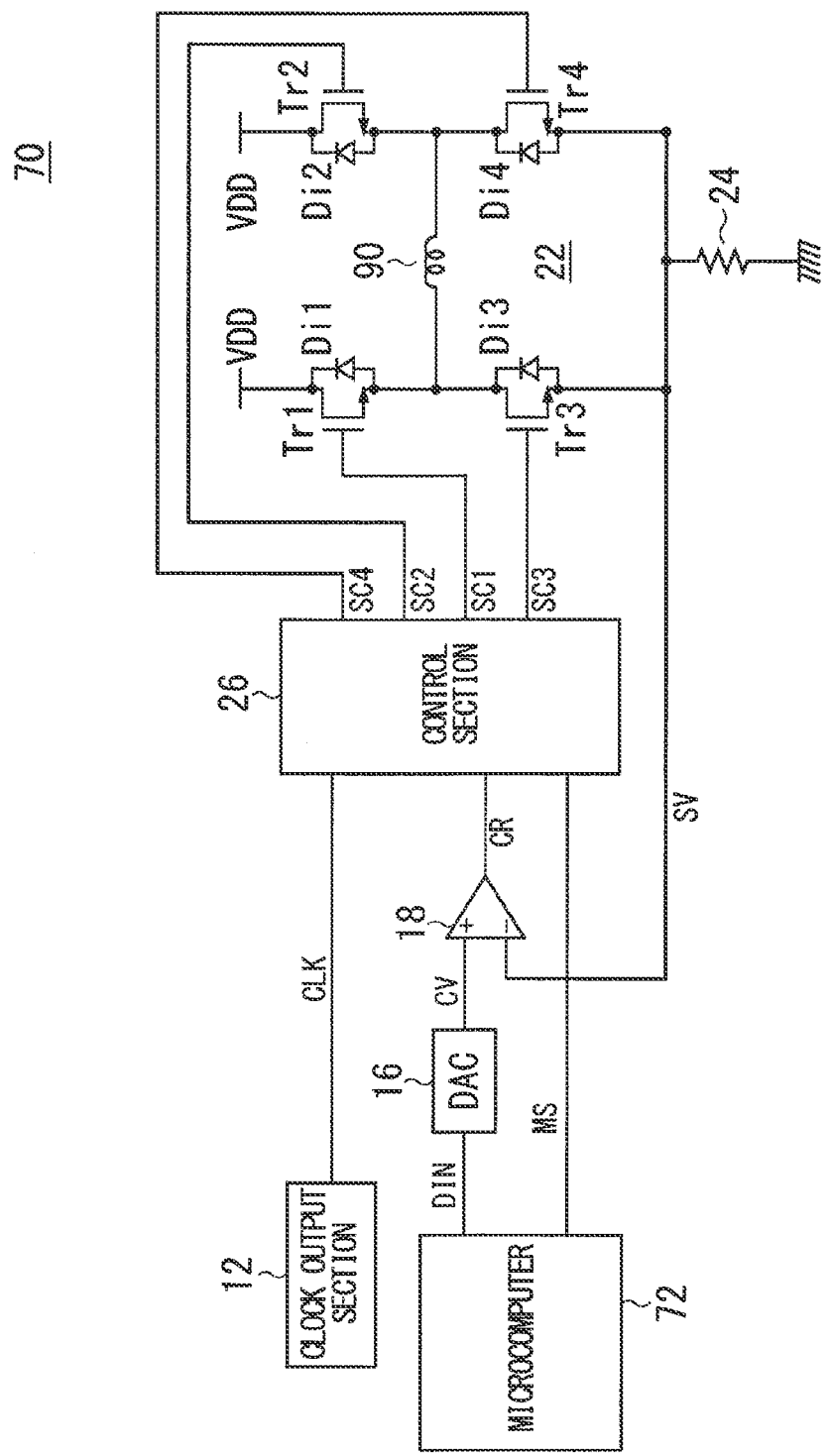
FIG. 16 is a drawing for describing the overall configuration of a motor drive apparatus 70.

FIG. 16 is a drawing for describing the overall configuration of a motor drive apparatus 70. The motor drive apparatus 70 controls the current flowing through a coil 90 for driving, such as a stepping motor. Here, the motor includes a plurality of coils 90, but for ease of explanation, FIG. 16 shows only one representative coil 90. The motor drive apparatus 70 receives a designation signal MS that designates a current mode including a conductive mode in which current flows through the coil 90 and a stop mode in which the flow of the current through the coil 90 is stopped, thereby controlling the current of the coil 90. The motor drive apparatus 70 receives a designation signal designating a reverse conductive mode at a time after receiving the designation signal designating the conductive mode and before receiving the designation signal MS designating the stop mode, and therefore causes the conductive mode to continue for a certain amount of time, thereby shortening the time needed until the current is stopped. Receiving the designation signal designating the reverse conductive mode includes receiving the designation signal designating the conductive mode of the backward direction mode after receiving the designation signal designating the conductive mode of the forward direction mode and before receiving the designation signal MS designating the stop mode, or receiving the designation signal designating the conductive mode of the forward direction mode after receiving the designation signal designating the conductive mode of the backward direction mode and before receiving the designation signal MS designating the stop mode.

A microcomputer 72 is connected to the D/A converter 16. The microcomputer 72 outputs the control current DIN to the D/A converter 16. The control current DIN is a digital value of the current flowing through the coil 90, and is used to determine which operational state is set.

The microcomputer 72 is connected to the control section 26. The microcomputer 72 outputs the designation signal MS that designates the current mode. The current mode includes the conductive mode, which has a forward direction mode and a backward direction mode, and the stop mode. The conductive mode is the mode in which the current flows through the coil 90. The stop mode is the mode in which the current flowing through the coil 90 is stopped.

The microcomputer 72 sets the designation signal designating the reverse conductive mode after receiving the designation signal designating the conductive mode and before receiving the designation signal MS designating the stop mode, based on a setting time that is set in advance. For example, the microcomputer 72 sets the designation signal designating the conductive mode of the backward direction mode after receiving the designation signal designating the conductive mode of the forward direction mode and before receiving the designation signal MS designating the stop mode. As another example, the microcomputer 72 sets the designation signal designating the conductive mode of the forward direction mode after receiving the designation signal designating the conductive mode of the backward direction mode and before receiving the designation signal MS designating the stop mode. The microcomputer 72 may change the setting time for setting the designation signal designating the reverse conductive mode after receiving the designation signal designating the conductive mode and before receiving the designation signal MS designating the stop mode.

Figure 17:
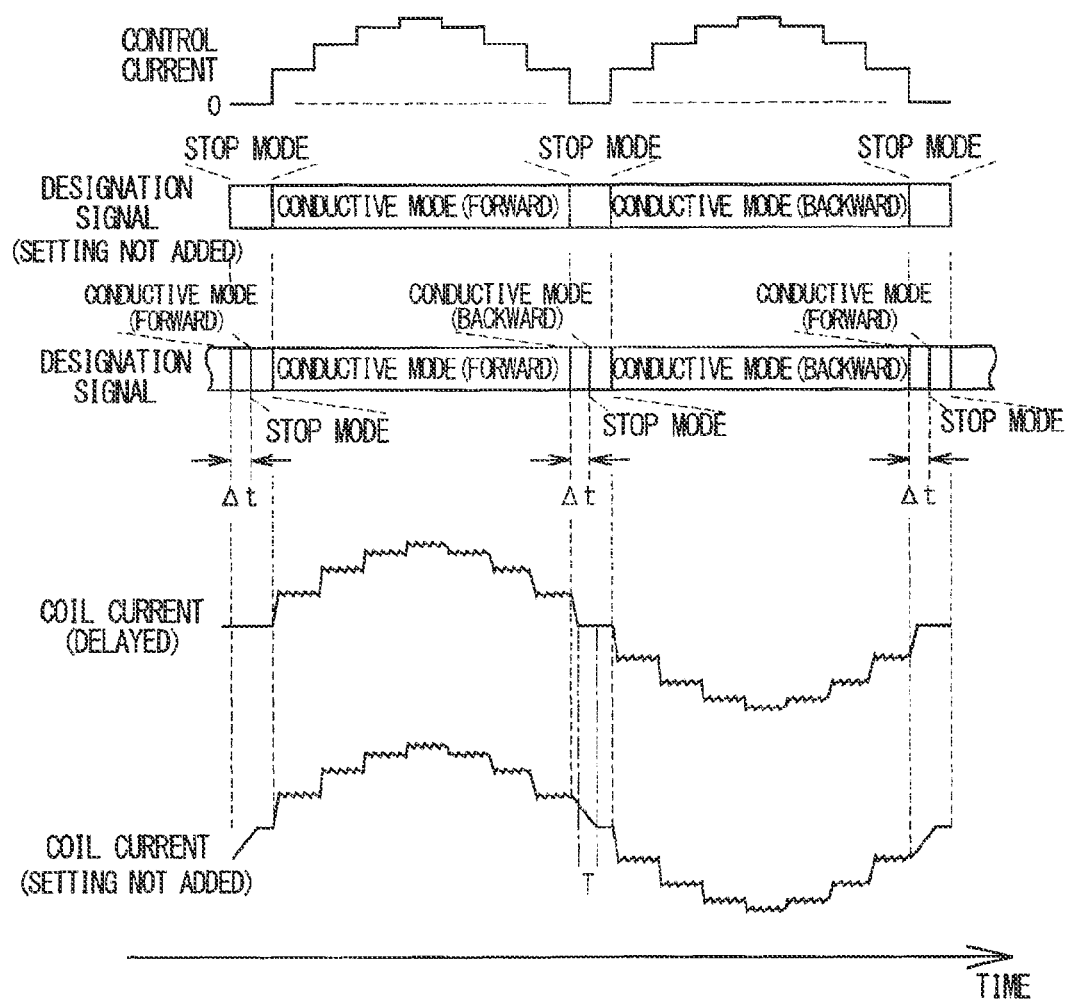
FIG. 17 shows the relationship between the current mode and the current flowing through the coil 90.

FIG. 17 shows the relationship between the current mode and the current flowing through the coil 90. The uppermost stage in FIG. 17 shows the control current output by the microcomputer 72. The second stage from the top shows the designation signal MS output by the microcomputer 72 in a case where the designation signal designating the reverse conductive mode is not received before receiving the designation signal MS designating the stop mode, as a comparison with the present embodiment. The third stage from the top shows the designation signal MS acquired by the driving section 34. The fourth stage from the top shows the current flowing through the coil 90 in a case where the designation signal designating the reverse conductive mode is received before receiving the designation signal MS designating the stop mode according to the present embodiment. The fifth stage from the top shows the current flowing through the coil 90 in a case where the designation signal designating the reverse conductive mode is not received before receiving the designation signal MS designating the stop mode, as a comparison with the present embodiment.

As shown in FIG. 17 when the control current becomes zero, the microcomputer 72 sets the designation signal designating the reverse conductive mode before the designation signal MS designating the stop mode is output. As a result, the driving section 34 acquires the designation signal designating the reverse conductive mode after receiving the designation signal designating the conductive mode and before receiving the designation signal MS designating the stop mode. Accordingly, until the setting time Δt has passed from when the control current becomes zero, the driving section 34 causes current to flow through the coil 90 in the regenerative state or the drive state of the conductive mode. Therefore, as shown in the fourth stage from the top in FIG. 17, the driving section 34 can cause the current of the coil to quickly become zero.

On the other hand, when the driving section 34 acquires the designation signal MS designating the stop mode output by the microcomputer 72 without there being an additional setting for the reverse conductive mode, the driving section 34 switches from the conductive mode to the stop mode at the same time that the control current becomes zero. Accordingly, in the stop mode, the current flows through the coil 90 according to the braking state, and therefore, compared to a case in which the stop mode is delayed such as in the present embodiment, the time needed for the current flowing through the coil 90 to reach zero is a time T longer than in a case where there is a delay.

The values such as number of components, connection relationships, and functions of the various configuration described in the above embodiments may be altered as desired.

For example, in the embodiment described above, the start of the designation signal MS designating the stop mode is delayed by a predetermined delay time Δt, but the delay control section 32 may change the delay time Δt. For example, the delay control section 32 may set the delay time Δt based on the current flowing through the coil 90 when the designation signal MS designating the stop mode is being received, i.e. the current flowing through the sense resistor 24. Specifically, the delay control section 32 may set the delay time Δt to be longer when the current flowing through the coil 90 is larger. As another example, during the time period of the delay time Δt, the delay control section 32 may end the delay time Δt if the current flowing through the coil 90, i.e. the current flowing through the sense resistor 24, becomes less than or equal to a reference current.

In the embodiments described above, the target is to realize control that causes the current flowing through the coil 90 to become zero, but the above embodiments may be applied to realize control in a case where the rotation of a motor is to be stopped.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A motor drive apparatus that controls a current flowing through a coil of a motor, comprising:
    a comparing section that compares the current flowing through the coil to a control current input thereto;
    an operation selecting section that selects an operational state from among a drive state, a regenerative state, and a braking state, according to a comparison result of the comparing section;
    a driving section that receives a designation signal designating a current mode that includes a conductive mode in which the current flows through the coil and a stop mode in which the current flowing through the coil is stopped, drives the coil in the operational state selected by the operation selecting section when the designation signal designating the conductive mode is received, and drives the coil in the braking state when the designation signal designating the stop mode is received; and
    a setting section that controls a start of the designation signal designating the stop mode or a start of a period during which the control current is zero.

2. The motor drive apparatus according to claim 1, wherein
    the setting section includes a delay control section that, when the designation signal designating the stop mode of the current mode is received, delays the start of the designation signal designating the stop mode for the driving section.

3. The motor drive apparatus according to claim 2, wherein
    the conductive mode includes a forward direction mode in which the current flows in a forward direction through the coil and a backward direction mode in which the current flows through the coil in a direction opposite the forward direction.

4. The motor drive apparatus according to claim 3, wherein
    while the delay control section is receiving the designation signal designating the stop mode and delaying the designation signal designating the stop mode, the driving section drives the coil in the current mode designated before the designation of the stop mode.

5. The motor drive apparatus according to claim 2, wherein
    the delay control section does not delay an end of the stop mode.

6. The motor drive apparatus according to claim 2, wherein
    the delay control section delays the start of the designation signal designating the stop mode based on a predetermined delay time.

7. The motor drive apparatus according to claim 2, wherein
    the delay control section changes a delay time for delaying the start of the designation signal designating the stop mode.

8. The motor drive apparatus according to claim 7, wherein
    the delay control section sets the delay time based on the current flowing through the coil when the designation signal designating the stop mode is received.

9. The motor drive apparatus according to claim 2, wherein
    the driving section, when the designation signal designating the stop mode is received, turns OFF a switch on a power supply side of a path of a regenerative current flowing in the regenerative state selected within a delay time to realize a regenerative state in which a portion of the path of the regenerative current has a diode connected in parallel to the switch on the power supply side of the path of the regenerative current, and
    the driving section, in the regenerative state selected when the designation signal designating the conductive mode is received, realizes the regenerative state in which the switch on the power supply side of the path of the regenerative current is turned ON.

10. The motor drive apparatus according to claim 2, wherein
    the driving section, when the designation signal designating the stop mode is received, turns OFF a switch on a side opposite a power supply of a path of a regenerative current flowing in the regenerative state selected within a delay time to realize a regenerative state in which a portion of the path of the regenerative current has a diode connected in parallel to the switch on the side opposite the power supply of the path of the regenerative current, and the driving section, in the regenerative state selected when the designation signal designating the conductive mode is received, realizes the regenerative state in which the switch on the side opposite the power supply of the path of the regenerative current is turned ON.

11. The motor drive apparatus according to claim 1, wherein
the setting section includes a shift section that causes the start of the period in which the control current is zero to be earlier.

12. The motor drive apparatus according to claim 11, wherein
the conductive mode includes a forward direction mode in which the current flows in a forward direction through the coil and a backward direction mode in which the current flows through the coil in a direction opposite the forward direction.

13. The motor drive apparatus according to claim 12, wherein
during the period by which the start of the period in which the control current is zero is made earlier by the shift section, the driving section drives the coil in the current mode designated before the designation of the stop mode.

14. The motor drive apparatus according to claim 11, wherein
the shift section does not cause an end of the period in which the control current is zero to be earlier.

15. The motor drive apparatus according to claim 11, wherein
the shift section causes the start of the period in which the control current is zero to be earlier based on a predetermined early time.

16. The motor drive apparatus according to claim 11, wherein
the shift section changes an early time by which the start of the period in which the control current is zero is caused to be earlier.

17. The motor drive apparatus according to claim 1, wherein
the setting section is a microcomputer that sets a designation signal designating a reverse conductive mode after receiving the designation signal designating the conductive mode and before receiving the designation signal designating the stop mode.

18. The motor drive apparatus according to claim 17, wherein
the conductive mode includes a forward direction mode in which the current flows in a forward direction through the coil and a backward direction mode in which the current flows through the coil in a direction opposite the forward direction.

19. The motor drive apparatus according to claim 18, wherein
the setting section sets a designation signal designating the conductive mode of the backward direction mode after receiving a designation signal designating the conductive mode of the forward direction mode and before receiving the designation signal designating the stop mode.

20. The motor drive apparatus according to claim 18, wherein
the setting section sets a designation signal designating the conductive mode of the forward direction mode after receiving a designation signal designating the conductive mode of the backward direction mode and before receiving the designation signal designating the stop mode.

21. The motor drive apparatus according to claim 17, wherein
the setting section sets the designation signal designating the reverse conductive mode after receiving the designation signal designating the conductive mode and before receiving the designation signal designating the stop mode, based on a predetermined setting time.

22. The motor drive apparatus according to claim 17, wherein
the setting section changes a setting time for setting the designation signal designating the reverse conductive mode after receiving the designation signal designating the conductive mode and before receiving the designation signal designating the stop mode.

* * * * *